US009887728B2

(12) United States Patent
Jain et al.

(10) Patent No.: US 9,887,728 B2
(45) Date of Patent: *Feb. 6, 2018

(54) SINGLE CHANNEL FULL DUPLEX WIRELESS COMMUNICATIONS

(75) Inventors: Mayank Jain, Sunnyvale, CA (US);
Jung Il Choi, Santa Clara, CA (US);
Kannan Srinivasan, Dublin, OH (US);
Philip Levis, San Francisco, CA (US);
Sachin Katti, Stanford, CA (US);
Siddharth Seth, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 49 days.

This patent is subject to a terminal disclaimer.

(21) Appl. No.: 13/293,069

(22) Filed: Nov. 9, 2011

(65) Prior Publication Data

US 2012/0201173 A1    Aug. 9, 2012

Related U.S. Application Data

(60) Provisional application No. 61/462,493, filed on Feb. 3, 2011, provisional application No. 61/485,980, filed on May 13, 2011.

(51) Int. Cl.
*H04B 1/56* (2006.01)
*H04B 1/18* (2006.01)
(Continued)

(52) U.S. Cl.
CPC .............. *H04B 1/525* (2013.01); *H04B 1/18* (2013.01); *H04B 1/56* (2013.01); *H04L 27/2626* (2013.01); *H04L 27/2647* (2013.01)

(58) Field of Classification Search
CPC . H04B 1/525; H04B 7/10; H04B 1/18; H04B 1/56; H04L 5/14; H04L 5/16;
(Continued)

(56) References Cited

U.S. PATENT DOCUMENTS 3,922,617 A    11/1975   Denniston et al.
4,952,193 A     8/1990   Talwar
(Continued)

FOREIGN PATENT DOCUMENTS

EP    0755141 A2    1/1997
EP     755141 A2   10/2005
(Continued)

OTHER PUBLICATIONS

PCT International Search Report and Written Opinion dated May 17, 2012 for PCT application No. PCT/US2012/023183.
(Continued)

*Primary Examiner* — Walter Divito
*Assistant Examiner* — Anthony Luo
(74) *Attorney, Agent, or Firm* — Alston & Bird LLP

(57) ABSTRACT

In one aspect there is provided a method. The method may include receiving a first analog radio frequency signal including a signal of interest and an interference signal caused by a second analog radio frequency signal transmitted in full duplex over a channel from which the first analog transmission is received; combining the first analog radio frequency signal and a portion of the second analog radio frequency signal to generate an output analog radio frequency signal characterized by at least a reduction or an elimination of the interference signal included in the output analog radio frequency signal; and providing the output analog radio frequency signal. Related apparatus, systems, methods, and articles are also described.

18 Claims, 12 Drawing Sheets

(51) Int. Cl.
*H04L 27/26* (2006.01)
*H04B 1/525* (2015.01)

(58) Field of Classification Search
CPC ............ H04L 27/2647; H04L 27/2626; H01Q 3/2605; H01Q 21/00
See application file for complete search history.

(56) References Cited

U.S. PATENT DOCUMENTS

| | | | |
|---|---|---|---|
| 5,212,827 A | 5/1993 | Meszko et al. | |
| 5,444,864 A | 8/1995 | Smith | |
| 5,691,978 A | 11/1997 | Kenworthy | |
| 5,734,967 A | 3/1998 | Kotzin et al. | |
| 5,790,658 A | 8/1998 | Yip et al. | |
| 5,930,301 A | 7/1999 | Chester et al. | |
| 6,215,812 B1 | 4/2001 | Young et al. | |
| 6,411,250 B1 | 6/2002 | Oswald et al. | |
| 6,539,204 B1 | 3/2003 | Marsh et al. | |
| 6,567,649 B2 | 5/2003 | Souissi | |
| 6,639,551 B2 | 10/2003 | Li et al. | |
| 6,725,017 B2 | 4/2004 | Blount et al. | |
| 6,745,018 B1 | 6/2004 | Zehavi et al. | |
| 6,965,657 B1 | 11/2005 | Rezvani et al. | |
| 7,336,940 B2* | 2/2008 | Smithson | 455/326 |
| 7,349,505 B2 | 3/2008 | Blount et al. | |
| 7,362,257 B2 | 4/2008 | Bruzzone et al. | |
| 7,426,242 B2 | 9/2008 | Thesling | |
| 7,869,527 B2 | 1/2011 | Vetter et al. | |
| 8,055,235 B1 | 11/2011 | Gupta et al. | |
| 8,060,803 B2 | 11/2011 | Kim | |
| 8,086,191 B2 | 12/2011 | Fukuda et al. | |
| 8,155,595 B2 | 4/2012 | Sahin et al. | |
| 8,175,535 B2 | 5/2012 | Mu | |
| 8,179,990 B2* | 5/2012 | Orlik et al. | 375/267 |
| 8,218,697 B2 | 7/2012 | Guess et al. | |
| 8,331,477 B2 | 12/2012 | Huang et al. | |
| 8,351,533 B2* | 1/2013 | Shrivastava et al. | 375/267 |
| 8,385,871 B2 | 2/2013 | Wyville | |
| 8,422,540 B1 | 4/2013 | Negus et al. | |
| 8,755,756 B1 | 6/2014 | Zhang et al. | |
| 8,995,410 B2 | 3/2015 | Balan et al. | |
| 9,042,838 B2 | 5/2015 | Braithwaite | |
| 9,054,795 B2 | 6/2015 | Choi et al. | |
| 9,124,475 B2 | 9/2015 | Li et al. | |
| 9,184,902 B2 | 11/2015 | Khojastepour et al. | |
| 2002/0064245 A1 | 5/2002 | McCorkle | |
| 2003/0031279 A1 | 2/2003 | Blount et al. | |
| 2003/0099287 A1 | 5/2003 | Arambepola | |
| 2003/0148748 A1 | 8/2003 | Shah | |
| 2004/0106381 A1* | 6/2004 | Tiller | H04B 17/11 455/73 |
| 2005/0078743 A1 | 4/2005 | Shohara | |
| 2005/0129152 A1 | 6/2005 | Hillstrom | |
| 2005/0159128 A1 | 7/2005 | Collins et al. | |
| 2005/0190870 A1 | 9/2005 | Blount et al. | |
| 2005/0254555 A1 | 11/2005 | Teague | |
| 2005/0282500 A1 | 12/2005 | Wang et al. | |
| 2006/0029124 A1 | 2/2006 | Grant et al. | |
| 2006/0030277 A1* | 2/2006 | Cyr | H01L 24/06 455/77 |
| 2006/0058022 A1* | 3/2006 | Webster | H01Q 3/267 455/423 |
| 2006/0083297 A1 | 4/2006 | Yan et al. | |
| 2006/0209754 A1* | 9/2006 | Ji | H04J 11/005 370/329 |
| 2007/0018722 A1 | 1/2007 | Jaenecke | |
| 2007/0105509 A1 | 5/2007 | Muhammad et al. | |
| 2007/0207747 A1 | 9/2007 | Johnson et al. | |
| 2007/0223617 A1* | 9/2007 | Lee | H04B 7/0854 375/267 |
| 2007/0249314 A1 | 10/2007 | Sanders et al. | |
| 2007/0274372 A1 | 11/2007 | Asai et al. | |
| 2008/0037801 A1 | 2/2008 | Alves et al. | |
| 2008/0089397 A1 | 4/2008 | Vetter et al. | |
| 2008/0107046 A1* | 5/2008 | Kangasmaa et al. | 370/278 |
| 2008/0131133 A1 | 6/2008 | Blunt et al. | |
| 2008/0192636 A1 | 8/2008 | Briscoe et al. | |
| 2008/0219339 A1 | 9/2008 | Chrabieh et al. | |
| 2008/0219377 A1* | 9/2008 | Nisbet | 375/296 |
| 2009/0022089 A1* | 1/2009 | Rudrapatna | 370/328 |
| 2009/0034437 A1 | 2/2009 | Shin et al. | |
| 2009/0047914 A1 | 2/2009 | Axness et al. | |
| 2009/0115912 A1 | 5/2009 | Liou et al. | |
| 2009/0180404 A1 | 7/2009 | Jung et al. | |
| 2009/0186582 A1 | 7/2009 | Muhammad et al. | |
| 2009/0221231 A1 | 9/2009 | Weng et al. | |
| 2009/0303908 A1 | 12/2009 | Deb et al. | |
| 2010/0014600 A1 | 1/2010 | Li et al. | |
| 2010/0014614 A1 | 1/2010 | Leach et al. | |
| 2010/0022201 A1* | 1/2010 | Vandenameele | 455/78 |
| 2010/0031036 A1 | 2/2010 | Chauncey et al. | |
| 2010/0056166 A1 | 3/2010 | Tenny | |
| 2010/0103900 A1* | 4/2010 | Yeh et al. | 370/330 |
| 2010/0117693 A1 | 5/2010 | Lorg et al. | |
| 2010/0136900 A1* | 6/2010 | Seki | H04B 7/15578 455/9 |
| 2010/0150033 A1 | 6/2010 | Zinser et al. | |
| 2010/0159837 A1* | 6/2010 | Dent | H04B 1/525 455/63.1 |
| 2010/0159858 A1 | 6/2010 | Dent et al. | |
| 2010/0215124 A1 | 8/2010 | Zeong et al. | |
| 2010/0226416 A1 | 9/2010 | Dent et al. | |
| 2010/0226448 A1 | 9/2010 | Dent | |
| 2010/0232324 A1* | 9/2010 | Radunovic et al. | 370/277 |
| 2010/0279602 A1* | 11/2010 | Larsson et al. | 455/7 |
| 2010/0295716 A1 | 11/2010 | Yamaki et al. | |
| 2011/0013684 A1 | 1/2011 | Semenov et al. | |
| 2011/0026509 A1 | 2/2011 | Tanaka | |
| 2011/0149714 A1 | 6/2011 | Rimini et al. | |
| 2011/0171922 A1 | 7/2011 | Kim et al. | |
| 2011/0216813 A1 | 9/2011 | Baldemair et al. | |
| 2011/0222631 A1 | 9/2011 | Jong | |
| 2011/0243202 A1 | 10/2011 | Lakkis | |
| 2011/0256857 A1 | 10/2011 | Chen et al. | |
| 2011/0268232 A1 | 11/2011 | Park et al. | |
| 2011/0311067 A1* | 12/2011 | Harris | H03G 3/3089 381/71.1 |
| 2011/0319044 A1 | 12/2011 | Bornazyan | |
| 2012/0021153 A1 | 1/2012 | Bhandari et al. | |
| 2012/0063369 A1* | 3/2012 | Lin et al. | 370/279 |
| 2012/0063373 A1* | 3/2012 | Chincholi et al. | 370/281 |
| 2012/0140685 A1 | 6/2012 | Lederer et al. | |
| 2012/0147790 A1* | 6/2012 | Khojastepour et al. | 370/277 |
| 2012/0154249 A1* | 6/2012 | Khojastepour et al. | 343/893 |
| 2012/0155335 A1* | 6/2012 | Khojastepour et al. | 370/278 |
| 2012/0155336 A1* | 6/2012 | Khojastepour et al. | 370/278 |
| 2012/0201153 A1 | 8/2012 | Bharadia et al. | |
| 2012/0201173 A1 | 8/2012 | Jain et al. | |
| 2013/0005284 A1 | 1/2013 | Dalipi | |
| 2013/0044791 A1 | 2/2013 | Rimini et al. | |
| 2013/0089009 A1 | 4/2013 | Li et al. | |
| 2013/0102254 A1 | 4/2013 | Cyzs et al. | |
| 2013/0114468 A1 | 5/2013 | Hui et al. | |
| 2013/0155913 A1 | 6/2013 | Sarca | |
| 2013/0166259 A1 | 6/2013 | Weber et al. | |
| 2013/0194984 A1 | 8/2013 | Cheng et al. | |
| 2013/0215805 A1 | 8/2013 | Hong et al. | |
| 2013/0225101 A1 | 8/2013 | Basaran et al. | |
| 2013/0253917 A1 | 9/2013 | Schildbach | |
| 2013/0301487 A1 | 11/2013 | Khandani | |
| 2013/0301488 A1 | 11/2013 | Hong et al. | |
| 2014/0126437 A1 | 5/2014 | Patil et al. | |
| 2014/0169236 A1 | 6/2014 | Choi et al. | |
| 2014/0206300 A1 | 7/2014 | Hahn et al. | |
| 2014/0219139 A1 | 8/2014 | Choi et al. | |
| 2014/0348018 A1 | 11/2014 | Bharadia et al. | |
| 2015/0156003 A1 | 6/2015 | Khandani | |
| 2015/0156004 A1 | 6/2015 | Khandani | |

(56) References Cited

U.S. PATENT DOCUMENTS

| | | |
|---|---|---|
| 2016/0226653 A1 | 8/2016 | Bharadia et al. |
| 2016/0234005 A1 | 8/2016 | Hong et al. |

FOREIGN PATENT DOCUMENTS

| | | |
|---|---|---|
| EP | 0755141 B1 | 10/2005 |
| EP | 1959625 B1 | 2/2009 |
| EP | 2237434 A1 | 10/2010 |
| EP | 2267946 A2 | 12/2010 |
| JP | 2001-196994 A | 7/2001 |
| JP | 2004-56315 A | 2/2004 |
| RU | 2256985 C2 | 7/2005 |
| WO | WO 2009/106515 A1 | 9/2009 |
| WO | WO 2012/106262 A1 | 8/2012 |
| WO | WO 2012/106263 A1 | 8/2012 |
| WO | 2013185106 A1 | 12/2013 |
| WO | 2014/093916 A1 | 6/2014 |
| WO | WO 2014/093916 A1 | 6/2014 |
| WO | WO 2014/121290 A1 | 8/2014 |
| WO | WO 2015/021481 A2 | 2/2015 |
| WO | WO 2015/048678 A1 | 4/2015 |
| WO | WO 2015/073905 A2 | 5/2015 |

OTHER PUBLICATIONS

PCT International Search Report and Written Opinion dated May 17, 2012 for PCT application No. PCT/US2012/023184.
Non-Final Office Action for U.S. Appl. No. 13/293,072 dated Jul. 19, 2013.
International Preliminary Report on Patentability for PCT Application No. PCT/US2012/023183 dated Aug. 6, 2013.
International Preliminary Report on Patentability for PCT Application No. PCT/US2012/023184 dated Aug. 6, 2013.
Final Office Action for U.S. Appl. No. 13/293,072 dated Mar. 31, 2014.
International Search Report and Written Opinion for PCT Application No. PCT/US2013/075166 dated Apr. 22, 2014.
International Search Report and Written Opinion for PCT Application No. PCT/US2014/014726 dated Jun. 2, 2014.
Bharadia et al., "Full Duplex Radios" SIGOMM, Aug. 12-16, 2013, Hong Kong, China, Copyright 2013 ACM 978-1-4503-2056-6/6/13/08, 12 pages.
International Search Report for PCT Application No. PCT/US2013/044830, dated Sep. 26, 2013, 2 pages.
Written Opinion for PCT Application No. PCT/US2013/044830, dated Sep. 26, 2013, 4 pages.
International Preliminary Report on Patentablility for PCT Application No. PCT/US2013/044830, dated Dec. 18, 2014, 5 pages.
International Search Report and Written Opinion for PCT Application No. PCT/US2014/050584 dated Jan. 21, 2015, 11 pages.
International Search Report and Written Opinion for PCT Application No. PCT/US2014/065814 dated Feb. 19, 2015, 11 pages.
Non-Final Office Action for U.S. Appl. No. 13/762,043 dated Nov. 17, 2014, 9 pages.
Non-Final Office Action for U.S. Appl. No. 13/913,323 dated Mar. 12, 2015, 11 pages.
Final Office Action for U.S. Appl. No. 13/913,323 dated Apr. 21, 2015, 5 pages.
Final Office Action for U.S. Appl. No. 13/762,043 dated Jun. 8, 2015, 11 pages.
Archer, et al., "Interface Contracts for TinyOS," IPSN '07: Proceedings of the 6th international conference on Information processing in sensor networks, pp. 158-165 (2007).
Aryafar, et al., "MIDU: Enabling MIMO Full Duplex," Proceedings of the 18th annual international conference on Mobile computing and networking, Mobicom '12, pp. 257-268, (2012).
Bahl, et al., "Reconsidering Wireless Systems With Multiple Radios," ACM SIG-COMM CCR, (2004).
Bahl, et al., "White Space Networking with Wi-Fi like Connectivity," SIGCOMM Comput. Commun. Rev., 39(4):27-38, (2009).
Bardwell, "Tech Report." [Retrieved from the Internet Dec. 3, 2016: <http://www.connect802.com/download/techpubs/2005/commercial_radios_E052315.pdf>].
Bicket, "Bit-rate Selection in Wireless Networks," Master's thesis, MIT, 2005.
Blefari-Melazzi, et al., "TCP Fairness Issues in IEEE 802.11 Networks: Problem Analysis and Solutions Based on Rate Control," IEEE Transactions on Wireless Communications, 6(4): 1346-1355 (2007).
Bliss, et al., "Simultaneous Transmission and Reception for Improved Wireless Network Performance," Proceedings of the 2007 IEEE Workshop on Statistical Signal Processing, (2007).
Bortz, et al., "The Simplex Gradient and Noisy Optimization Problems," North Carolina State University, Department of Mathematics, Center for Research in Scientific Computation, (1998).
Briggs, et al., "Power Measurements of OFDM Signals," IEEE Symposium on Electromagnetic Compatibility, (2004).
Burlingame, et al., "An Analog CMOS High-Speed Continuous-Time FIR Filter," Solid-State Circuits Research Laboratory, Department of Electrical and Computer Engineering, University of California, Davis, CA (2000).
Chandra, "A Case for Adapting Channel Width in Wireless Networks," ACM SIGCOMM, (2008).
Choi, et al., "Granting Silence to Avoid Wireless Collision," Proceedings of the 18th International Conference on Network Protocols (ICNP), (2010).
Choi, et al., "IEEE 802.11e Contention-Based Channel Access (EDCF) Performance Evaluation," IEEE ICC (2003).
Choi, et al., "The Case for a Network Protocol Isolation Layer," Sensys '09: Proceedings of the 7th ACM Conference on Embedded networked sensor systems (SenSys), pp. 267-280, (2009).
Chu, et al., "The Design and Implementation of a Declarative Sensor Network System," Proceedings of the 5th international conference on Embedded networked sensor systems, (2007).
Coffman, et al., "Channel Fragmentation in Dynamic Spectrum Access Systems—a Theoretical Study," ACM SIGMETRICS, (2010).
Culler, et al., "Towards a Sensor Network Architecture: Lowering the Waistline," Proceedings of the Tenth Workshop on Hot Topics in Operating Systems (HotOS-X), (2005).
Ding, "Digital Predistortion of Power Amplifiers for Wireless Applications," Ph.D Thesis, School of Electrical and Computer Engineering, Georgia Institute of Technology, (Mar. 2004).
Duarte, "Experiment-driven Characterization of Full-Duplex Wireless Systems," CoRR, abs/1107.1276, (2011).
Duarte, et al., "Full-Duplex Wireless Communications Using Off-The-Shelf Radios: Feasibility and First Results," Forty-Fourth Asilomar Conference on Signals, Systems, and Components, (2010).
Ettus Research, UHD Daughterboard Application Notes. [Retrieved from the Internet Dec. 8, 2016: <http://files.ettus.com/uhd_docs/manual/html/dboards.html>].
Ettus Research, Universal Software Radio Peripheral (USRP). [Retrieved from the Internet Dec. 3, 2016: <http://www.ettus.com>].
Everett, et al., "Empowering Full-Duplex Wireless Communication by Exploiting Directional Diversity," 2011 Conference Record of the Forty Fifth Asilomar Conference on Signals, Systems and Computers, pp. 2002-2006, (Nov. 2011).
Everett, et al., "Passive Self-Interference Suppression for Full-Duplex Infrastructure Nodes," CoRR, abs/1302.2185, (2013).
FCC, Table of Frequency Allocations. [Retrieved from the Internet Dec. 3, 2016: <http://transition.fcc.gov/oet/spectrum/table/fcctable.pdf>].
Fear, et al., "Enhancing breast tumor detection with near-field imaging," Microwave Magazine, IEEE, 3(1):48-56, (2002).
Gember, et al., "A Comparative Study of Handheld and Non-Handheld Traffic in Campus Wi-Fi Networks," Passive and Active Measurement Conf., (2011).
Gheorma, et al., "Rf Photonic Techniques for Same Frequency Simultaneous Duplex Antenna Operation," IEEE Photonics Technology Letters, 19(13): 1014-1016, (2007).

(56) References Cited

OTHER PUBLICATIONS

Gill, Slide Presentation: "RF performance of mobile terminals—a challenge for the industry," Cambridge Wireless Radio Technology Special Interest Group (SIG), (2011).
Gizmodo, "IPhone 4 Antenna-Gate," (2011). [Retrieved from the Internet Dec. 3, 2016: <http://gizmodo.com/5846638/giz-explains-whats-so-smart-about-the-iphone-4ss-antenna>].
Gnawali, et al., "Collected Tree Protocol," Proceedings of the 7th ACM Conference on Embedded Networked Sensor Systems (SenSys), pp. 1-14 (2009).
Goldsmith, "Wireless Communications," Cambridge University Press, (2004).
Gollakota, et al., "They Can Hear Your Heartbeats: Non-Invasive Security for Implantable Medical Devices," SIGCOMM Comput. Commun. Rev., 41(4), (Aug. 2011).
Gollakota, et al., "ZigZag Decoding: Combating Hidden Terminals in Wireless Networks," SIGCOMM '08: Proceedings of the ACM SIGCOMM 2008 Conference on Data Communication, pp. 159-170, (2008).
Gummadi, et al., "Understanding and Mitigating the Impact of RF Interference on 802.11 Networks," Proceedings of the 2007 conference on Applications, technologies, architectures, and protocols for computer communications (SIGCOMM), (2007).
Halperin, et al., "Taking the Sting out of Carrier Sense: Interference Cancellation for Wireless LANs." MobiCom '08: Proceedings of the 14th ACM international conference on Mobile computing and networking, pp. 339-350, (2008).
Harashima, "Matched-Transmission Technique for Channels With Intersymbol Interference," IEEE Transactions on Communications, COM-20:774-780, (1972).
Hong, et al, "DOF: A Local Wireless Information Plane," ACM SIGCOMM, (2011).
Hua, et al., "A method for Broadband Full-Duplex Mimo Radio," IEEE Signal Processing Letters, 19(12):793-796, (Dec. 2012).
Huang, "Optimal Transmission Strategies for Dynamic Spectrum Access in Cognitive Radio Networks," IEEE Transactions on Mobile Computing, 8(12): 1636-1648, (2009).
Huyer, et al., "SNOBFIT—Stable Noisy Optimization by Branch and Fit," ACM Trans. Math. Softw., 35:9:1-9:25, (Jul. 2008).
Intersil Corp, "Qhx220 Active Isolation Enhancer and Interference Canceller." [Retrieved from the Internet Dec. 6, 2016: <http://www.intersil.com/content/dam/Intersil/documents/qhx2/qhx220.pdf>].
Iyer, et al., "Specnet: Spectrum Sensing Sans Frontiers," USENIX NSDI, (2011).
Jamieson, et al., "PPR: Partial Packet Recovery for Wireless Networks," Proceedings of the 2007 conference on Applications, technologies, architectures, and protocols for computer communications (SIGCOMM), (2007).
Jiang, et al., "An Architecture for Energy Management in Wireless Sensor Networks," Proceedings of the International Workshop on Wireless Sensornet Architecture (WWSNA), (2007).
Jung, et al., "A Reconfigurable Carrier Leakage Canceler for UHF RFID Reader Front-Ends," IEEE Transactions on Circuits and Systems I: Regular Papers, 58(1):70-76, (Jan. 2011).
Khojastepour, et al., "The Case for Antenna Cancellation for Scalable Full Duplex Wireless Communications," ACM HOTNETS, (2011).
Kim, et al., "Co-Channel Interference Cancellation Using Single Radio Frequency and Baseband Chain," IEEE Transactions on Communications, 58(7):2169-2175, (2010).
Kim, et al., "Flush: A Reliable Bulk Transport Protocol for Multihop Wireless Networks," In Proceedings of the Fifth ACM Conference on Embedded networked sensor systems (SenSys), (2007).
Klues, et al., "Integrating Concurrency Control and Energy Management in Device Drivers," Proceedings of twenty-first ACM SIGOPS symposium on Operating systems principles (SOSP), (2007).
Knox, "Single Antenna Full Duplex Communications using a Common Carrier," 2012 IEEE 13th Annual Wireless and Microwave Technology Conference (WAMICON), pp. 1-6, (2012).
Lakshminarayanan, et al., "Rfdump; An Architecture for Monitoring the Wireless Ether," ACM CoNEXT, (2009).
Lamprecht, et al., "Passive Alignment of Optical Elements in a Printed Circuit Board," Electric Components and Technology Conference, (2006).
Lee, et al., "Improving Wireless Simulation Through Noise Modeling," Proceedings of the 6th international conference on Information processing in sensor networks (IPSN), pp. 21-30, (2007).
Leith, et al., "TCP Fairness in 802.11e WLANs," IEEE Communications Letters, 9(12), (2005).
Levis, et al., "T2: A Second Generation OS for Embedded Sensor Networks," Technical Report TKN-05-007, Telecommunication Networks Group, Technische Universitat Berlin, (2005).
Liang, et al., "Sensing-Throughput Tradeoff for Cognitive Radio Networks," IEEE Transactions on Wireless Communications, 7(4): 1326-1337, (2008).
Liang, et al., "Surviving Wi-Fi Interference in Low Power Zigbee Networks," Proceedings of the Eighth ACM Conference on Embedded Networked Sensor Systems (SenSys), (2010).
Lin, et al., "Data Discovery and Dissemination with DIP," Proceedings of the 7th international conference on Information processing in sensor networks (IPSN), pp. 433-444, (2008).
Matheus, "Optimal Design of a Multicarrier Systems with Soft Impulse Shaping Including Equalization in Time or Frequency Direction," Global Telecommunications Conference, 1997, GLOBECOM '97, IEEE, vol. 1, pp. 310-314, (Nov. 1997).
Maxim Integrated, Power Amplifier Data-sheet. [Retrieved from the Internet Dec. 6, 2016: <http://datasheets.maximintegrated.com/en/ds/MAX2828-MAX2829.pdf>].
Mini-Circuits, Power Amplifier Data-sheet. [Retrieved from the Internet Dec. 6, 2016: <http://www.minicircuits.com/pdfs/PGA-105+.pdf>].
Mini-Circuits, Power Amplifier Data-sheet. [Retrieved from the Internet Dec. 6, 2016: <http://www.minicircuits.com/pdfs/ZHL-30W-262+.pdf>].
Morgan, et al, "A Generalized Memory Polynomial Model for Digital Predistortion of RF Power Amplifiers," IEEE Transactions on Signal Processing, 54(10):3852-3860, (2006).
National Instruments, N1 5781 Datasheet, (2011). [Retrieved from the Internet Dec. 6, 2016: <http://sine.ni.com/ds/app/doc/p/id/ds-212/lang/en>].
National Instruments, NI PXIe-8133 User Manual, (Jul. 2012). [Retrieved from the Internet Dec. 13, 2016: <www.ni.com/pdf/manuals/372870d.pdf>].
National Instruments, White Paper: "Understanding Dynamic Hardware Specifications," (Mar. 2010).
Palazzi, et al., "A RIO-Like Technique for Interactivity Loss-Avoidance in Fast-Paced Multiplayer Online Games," ACM Computers in Entertainment, (2005).
Peregrine Semiconductor, PE 47303 Data-sheet. [Retrieved from the Internet Dec. 6, 2016: <http://www.psemi.com/pdf/datasheets/pe43703ds.pdf>].
Polastre, et al., "A Unifying Link Abstraction for Wireless Sensor Networks," SenSys '05: Proceedings of the 3rd international conference on Embedded networked sensor systems, pp. 76-89, (2005).
Poston, et al., "Discontiguous OFDM Considerations for Dynamic Spectrum Access in Idle TV Channels," IEEE DySPAN, (2005).
Radunović, et al., "Efficiency and Fairness in Distributed Wireless Networks Through Self-Interference Cancellation and Scheduling," Technical Report MSR-TR-2009-27, Microsoft Research, (2009).
Radunović, et al., "Rethinking Indoor Wireless Mesh Design: Low Power, Low Frequency, Full-duplex," Fifth IEEE Workshop on Wireless Mesh Networks (WiMesh), pp. 1-6, (2010).
Rahul, et al., "Learning to Share: Narrowband-Friendly Wideband Networks," ACM SIGCOMM, (2008).
Rice University, WARP Project. [Retrieved from the Internet Dec. 8, 2016: <http://warp.rice.edu>].
Rohde & Schwarz, "Rohde & Schwarz FSW Signal and Spectrum Analyzer User Manual," (2016). [Retrieved from the Internet Dec. 10, 2016: <https://cdn.rohde-schwarz.com/pws/dl_downloads/dl_common_library/dl_manuals/gb_1/f/fsw_1/FSW_UserManual_en_26.pdf>].

(56) References Cited

OTHER PUBLICATIONS

Rohde & Schwarz, "Rohde & Schwarz SMBV 100A Signal Generator User Manual," (2016). [Retrieved from the Internet Dec. 6, 2016: <https://cdn.rohde-schwarz.com/pws/dl_downloads/dl_common_library/dl_manuals/gb_1/s/smbv/SMBV100A_OperatingManual_en_16.pdf>].
Sahai, et al., "On the Impact of Phase Noise on Active Cancellation in Wireless Full-Duplex," CoRR, abs/1212.5462, (2012).
Sahai, et al., "Spectrum Sensing: Fundamental limits," draft chapter for a Springer Book: Cognitive Radios: System Design Perspective, (Jun. 2009).
Sen, et al., "AccuRate: Constellation Based Rate Estimation in Wireless Networks," Proceedings of the Seventh USENIX Symposium on Networked Systems Design and Implementation (NSDI), (2010).
Sen, et al., "CSMA/CN: Carrier Sense Multiple Access with Collision Notification," Proceedings of the 16th annual international conference on Mobile computing and networking (MobiCom), pp. 25-36, (2010).
Shen, et al., "Channel Estimation in OFDM Systems," Application Note, Freescale Semiconductor, (2006).
Srinivasan, et al., "An Empirical Study of Low-Power Wireless," ACM Transactions on Sensor Networks, 6(2):1-49, (2010).
Srinivasan, et al., "RSSI is Under Appreciated," Proceedings of the Third Workshop on Embedded Networked Sensors (EmNets), (2006).
Srinivasan, et al., "Some Implications of Low Power Wireless to IP Networking," Proceedings of the Fifth Workshop on Hot Topics in Networks (HotNets-V), (Nov. 2006).
Srinivasan, et al., "The κ-Factor: Inferring Protocol Performance Using Inter-Link Reception Correlation," Proceedings of the 16th annual international conference on Mobile computing and networking (MobiCom), (2010).
Srinivasan, et al., The β-factor: Measuring Wireless Link Burstiness, Proceedings of the Sixth ACM Conference on Embedded Networked Sensor Systems, (Nov. 2008).
Tan, et al., "Fine Grained Channel Access in Wireless LAN," ACM SIGCOMM, (2010).
Tan, et al., "Spectrum Virtualization Layer," MSR Tech Report, (2011). [Retrieved from the Internet Dec. 8, 2016: <http://research.microsoft.com/apps/pubs/default.aspx?id=154410>].
Tavakoli, et al., "A Declarative Sensornet Architecture," Proceedings of the International Workshop on Wireless Sensornet Architecture (WWSNA), (2007).
Tomlinson, "New Automatic Equaliser Employing Modulo Arithmetic," Electronic Letters, 7(5/6):138-139, (1971).
Tourrilhes, "Fragment Adaptive Reduction: Coping with Various interferers in radio unlicensed bands," IEEE IC, (2001).
Vutukuru, et al., "Cross-Layer Wireless Bit Rate Adaption," SIGCOMM Comput. Commun. Rev., 39(4):3-14, (2009).
Weingarten, et al., "The Capacity Region of the Gaussian Multiple-Input Multiple-Output Broadcast Channel," IEEE Transactions on Information Theory, 52(9):3936-3964, (2006).
Wi-Fi Alliance, WiFi Direct Industry White Paper, (2010), [Retrieved from the Internet Dec. 13, 2016: <http://www.wi-fi.org/discover-wi-fi/wi-fi-direct>].
Winter, et al., "RPL: IPv6 Routing Protocol for Low power and Lossy Networks," IETF Internet draft (Work in Progress), (Jul. 2010). [Retrieved from the Internet Dec. 8, 2016: <https://tools.ietf.org/id/draft-ietf-roll-rpl-11.txt>].
Wischik, et al., "Design, implementation and evaluation of congestion control for multipath TCP," USENIX NSDI, (2011).

Xilinx, DS249: LogiCore IP CORDIC v4.0 Data Sheet, (Mar. 1, 2011). [Retrieved from the Internet Dec. 3, 2016: <http://www.xilinx.com/support/documentation/ip_documentation/cordic_ds249.pdf>].
Xilinx, UG193: XtremeDSP User Guide, (Jan. 26, 2012). [Retrieved from the Internet Dec. 6, 2016: <https://www.xilinx.com/support/documentation/user_guides/ug193.pdf>].
Yang, et al., "Supporting Demanding Wireless Applications with Frequency-agile Radios," USENIX NSDI, (2010).
Yang, et al., "The Spaces Between Us: Sensing and Maintaining Boundaries in Wireless Spectrum Access," ACM MOBICOM, (2010).
Yoo, et al., "On the Optimality of Multiantenna Broadcast Scheduling Using Zero-Forcing Beamforming," IEEE Journal on Selected Areas in Communications, 24(3):528-541, (2006).
Yuan, et al., "KNOWS: Kognitiv Networking Over White Spaces," IEEE DySPAN, (2007).
Zhang, et al., "Gain/Phase Imbalance-Minimization Techniques for LINC Transmitters," IEEE Transactions on Microwave Theory and Techniques, 49(12):2507-2516, (2001).
Chinese Application No. 201380041721.0, First Office Action dated Nov. 18, 2015.
EPO Application No. 20130801200, Supplementary European Search Report dated Feb. 4, 2016.
PCT International Preliminary Report on Patentablility for application PCT/US2013/075166 dated Jun. 16, 2015.
PCT International Preliminary Report on Patentablility for application PCT/US2014/014726 dated Aug. 4, 2015.
PCT International Preliminary Report on Patentablility for application PCT/US2014/050584 dated Feb. 9, 2016.
PCT International Preliminary Report on Patentablility for application PCT/US2014/058117 dated Mar. 29, 2016.
PCT International Preliminary Report on Patentablility for application PCT/US2014/065814 dated May 17, 2016.
PCT International Search Report and Written Opinion of the International Searching Authority for application PCT/US2012/023183 dated May 17, 2012.
PCT International Search Report and Written Opinion of the International Searching Authority for application PCT/US2014/058117 dated Dec. 30, 2014.
U.S. Appl. No. 13/293,069, Final Office Action dated Oct. 21, 2014.
U.S. Appl. No. 13/293,069, Non-Final Office Action dated May 1, 2014.
U.S. Appl. No. 13/293,069, Non-Final Office Action dated Jul. 17, 2013.
U.S. Appl. No. 13/293,072, Final Office Action dated Mar. 15, 2016.
U.S. Appl. No. 13/293,072, Non-Final Office Action dated Jan. 13, 2017.
U.S. Appl. No. 13/293,072, Non-Final Office Action dated Jul. 17, 2015.
U.S. Appl. No. 13/762,043, Notice of Allowance dated Nov. 9, 2015.
U.S. Appl. No. 13/913,323, Notice of Allowance dated Feb. 12, 2016.
U.S. Appl. No. 13/913,323, Notice of Allowance dated Oct. 16, 2015.
U.S. Appl. No. 13/913,323, Notice of Allowance dated Nov. 5, 2015.
U.S. Appl. No. 13/913,323, Notice of Allowance dated Nov. 13, 2015.
U.S. Appl. No. 14/456,807, Non-Final Office Action dated Mar. 4, 2016.

\* cited by examiner

SINGLE CHANNEL FULL DUPLEX WIRELESS COMMUNICATIONS

CROSS-REFERENCE TO RELATED APPLICATIONS

This application claims the benefit of U.S. Provisional Patent Application Ser. No. 61/462,493, filed on Feb. 3, 2011, and entitled "Single Channel Full Duplex Wireless Communications," and U.S. Provisional Patent Application Ser. No. 61/485,980, filed on May 13, 2011, and entitled "Adaptive Techniques For Full-Duplex Wireless," both of which are incorporated by reference herein in their entirety.

STATEMENT OF GOVERNMENT SPONSORED SUPPORT

This invention was made with Government support under contract 0615308 awarded by NSF. The Government has certain rights in this invention.

FIELD

The subject matter described herein relates to wireless communications.

BACKGROUND

Wireless systems often operate in half duplex. For example, a radio configured for half duplex may communicate with another device by transmitting or receiving, but the radio does not simultaneously transmit and receive. Unlike half duplex, a device configured to communicate in full duplex may simultaneously transmit and receive, but the simultaneous transmit and receive are done over different frequencies. For example, a full duplex cell phone uses a first frequency channel for transmission and a second frequency channel for reception. Without different transmit and receive frequency channels, the full duplex radio, such as for example the cell phone, would suffer interference from its own transmission. Specifically, the radio would interfere with itself because the radio's transmission would also be received at the radio's receiver causing so-called "self-interference." In short, devices, such as for example cell phones, wireless user equipment, and the like, use different transmit frequency channels and receive frequency channels to avoid unwanted self-interference.

SUMMARY

The subject matter disclosed herein provides methods and apparatus, including computer program products for full duplex communications.

In one aspect, there is provided a method. The method may include receiving a first analog radio frequency signal including a signal of interest and an interference signal caused by a second analog radio frequency signal transmitted in full duplex over the channel from which the first analog transmission is received; combining the first analog radio frequency signal and a portion of the second analog radio frequency signal to generate an output analog radio frequency signal characterized by at least a reduction or an elimination of the interference signal included in the output analog radio frequency signal; and providing the output analog radio frequency signal.

In some implementations, the above-noted aspects may further include additional features described herein including one or more of the following. The interference signal in the first analog radio frequency signal may be reduced based on a plurality of antennas positioned to enable destructive interference of the interference signal. At least three of the plurality of antennas may comprise a receive antenna, a first transmit antenna, and a second transmit antenna, wherein the first transmit antenna and the receive antenna are positioned at first distance, and the receive antenna and the second transmit antenna are positioned at a second distance comprising a sum of the first distance and an odd multiple of one half of a wavelength of the channel. The plurality of antennas may be configured in accordance with multiple input, multiple output. The portion of the second analog radio frequency signal may be offset with respect to the first analog radio frequency signal before the combining of the first analog radio frequency signal and the portion of the second analog radio frequency signal. The portion of the second analog radio frequency signal may be inverted with respect to the first analog radio frequency signal before the combining of the first analog radio frequency signal and the portion of the second analog radio frequency signal. A balun may be used to invert at least one of the first analog radio frequency signal and the portion of the second analog radio frequency signal. A portion of the second analog radio frequency signal may be subtracted from the first analog radio frequency signal by using an analog subtraction circuit comprising a balun. The output analog radio frequency signal may be converted to a digital output, and a portion of the digital output may be digitally cancelled to at least further reduce the interference signal. The second analog radio frequency signal may be transmitted in full duplex over the single channel from which the first analog transmission is received. At least three of the plurality of antennas may include a transmit antenna, a first receive antenna, and a second receive antenna, wherein the first receive antenna and the transmit antenna are positioned at first distance, and the transmit antenna and the second receive antenna are positioned at a second distance comprising a sum of the first distance and an odd multiple of one half of a wavelength of the channel. Moreover, at least three of the plurality of antennas may comprise a receive antenna, a first transmit antenna, and a second transmit antenna, wherein at least one the first transmit antenna and the second transmit antenna are coupled to at least one transmission line configured to cause a delay causing destructive interference of the interference signal. At least three of the plurality of antennas may comprise a transmit antenna, a first receive antenna, and a second receive antenna, wherein at least one the first receive antenna and the second receive antenna are coupled to at least one transmission line configured to cause a delay causing destructive interference of the interference signal.

Articles are also described that comprise a tangibly embodied machine-readable medium embodying instructions that, when performed, cause one or more machines (e.g., computers, etc.) to result in operations described herein. Similarly, computer systems are also described that may include a processor and a memory coupled to the processor. The memory may include one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

Figure 1:
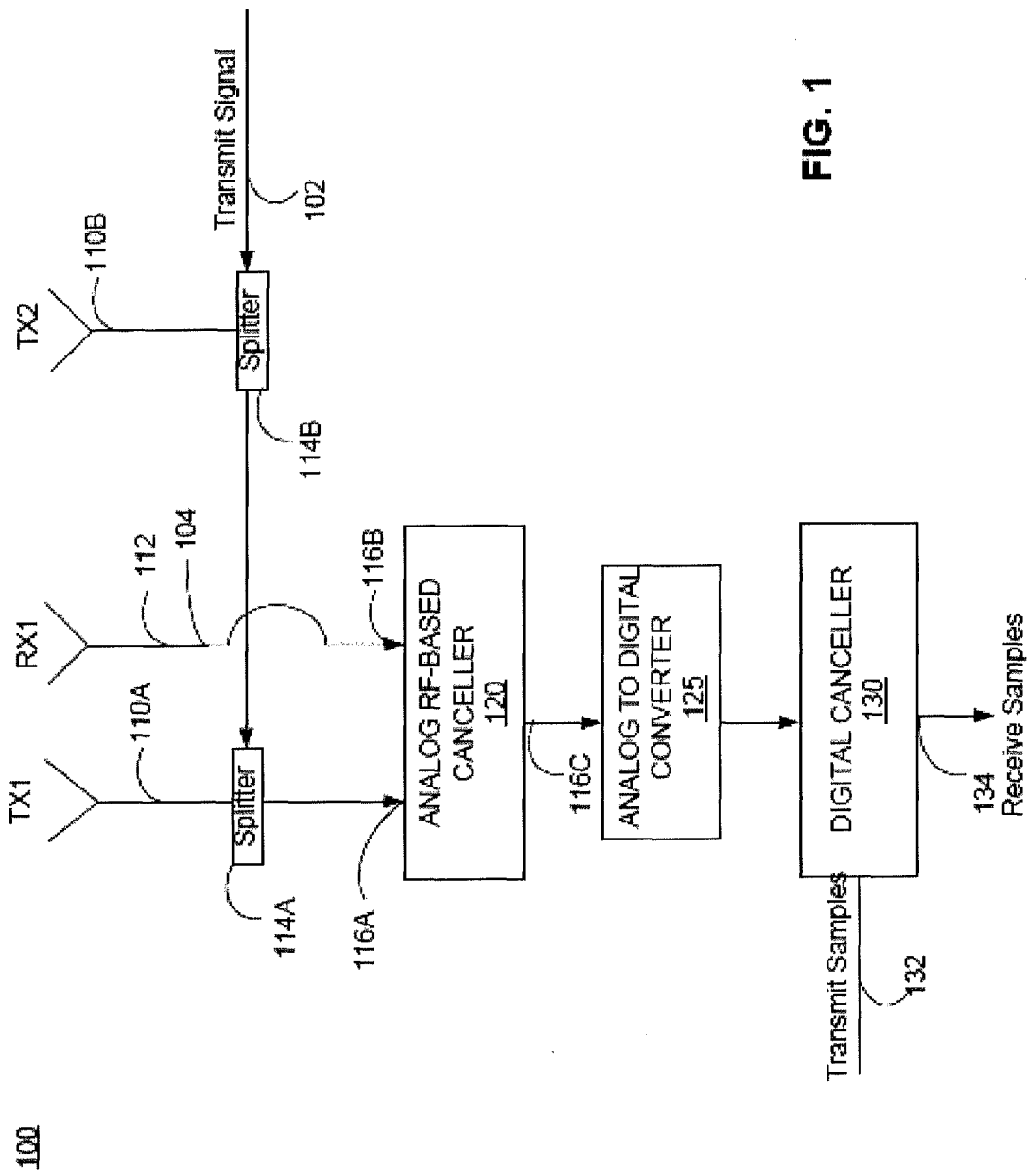
FIG. 1 depicts an example of a system configured in accordance with some exemplary embodiments described herein.

Like labels are used to refer to same or similar items in the drawings.

DETAILED DESCRIPTION

FIG. 1 depicts an example of a system 100 for full duplex wireless communications consistent with some exemplary embodiments. Referring to FIG. 1, a signal to be transmitted ("transmit signal") 102 is provided to a splitter 114B. The splitter 114B provides a portion of signal 102 to a transmitter 110B, where the signal 102 is transmitted. The splitter 114B also provides another portion of signal 102 to splitter 114A. Splitter 114A divides signal 102 to provide a portion to transmitter 110A and another portion to an analog RF-based canceller 120. The transmitter 110A then proceeds to transmit its portion of signal 102.

The analog RF-based canceller 120 includes inputs 116A-B. The first input 116A represents a sample of signal 102 transmitted by transmitters 110A-B. The second input 116B represents a received signal 104 obtained from receiver 112. This received signal 104 may include a so-called "self-interference" signal and a signal of interest. The self-interference represents the signals transmitted at 110A-B by system 100 and subsequently received at the receiver 112 of the same device. The signal of interest may represent a signal transmitted by another device, such as for example another radio, cell phone, base stations, repeaters, wireless access points, and the like. The analog RF-based canceller 120 is configured to remove some, if not all, of the unwanted self-interference received by receiver 112 of system 100. This reduction and/or removal of the self-interference may, in some implementations, enable system 100 to operate effectively in full duplex over the same frequency channel, eliminating thus the need to use different frequency channels for simultaneous, full duplex transmit and receive. In short, the system 100 is able to operate in full duplex by transmitting at 110A-B while simultaneously receiving at receiver 112 by at least using the analog RF-based canceller 120 to reduce the self-interference caused by the transmitters 110A-B.

In some exemplary embodiments, the antennas for transmitter 110A-B and receiver 112 are positioned in order to reduce some of the unwanted self-interference received by system 100. Specifically, the placement of the antennas for transmitter 110A-B and receiver 112 may use constructive and destructive interference patterns in free space to reduce some of the unwanted self-interference. The use of constructive and destructive interference patterns to reduce and/or remove self-interference may be referred to herein as antenna cancellation and/or antenna placement-based cancellation.

Figure 2A:
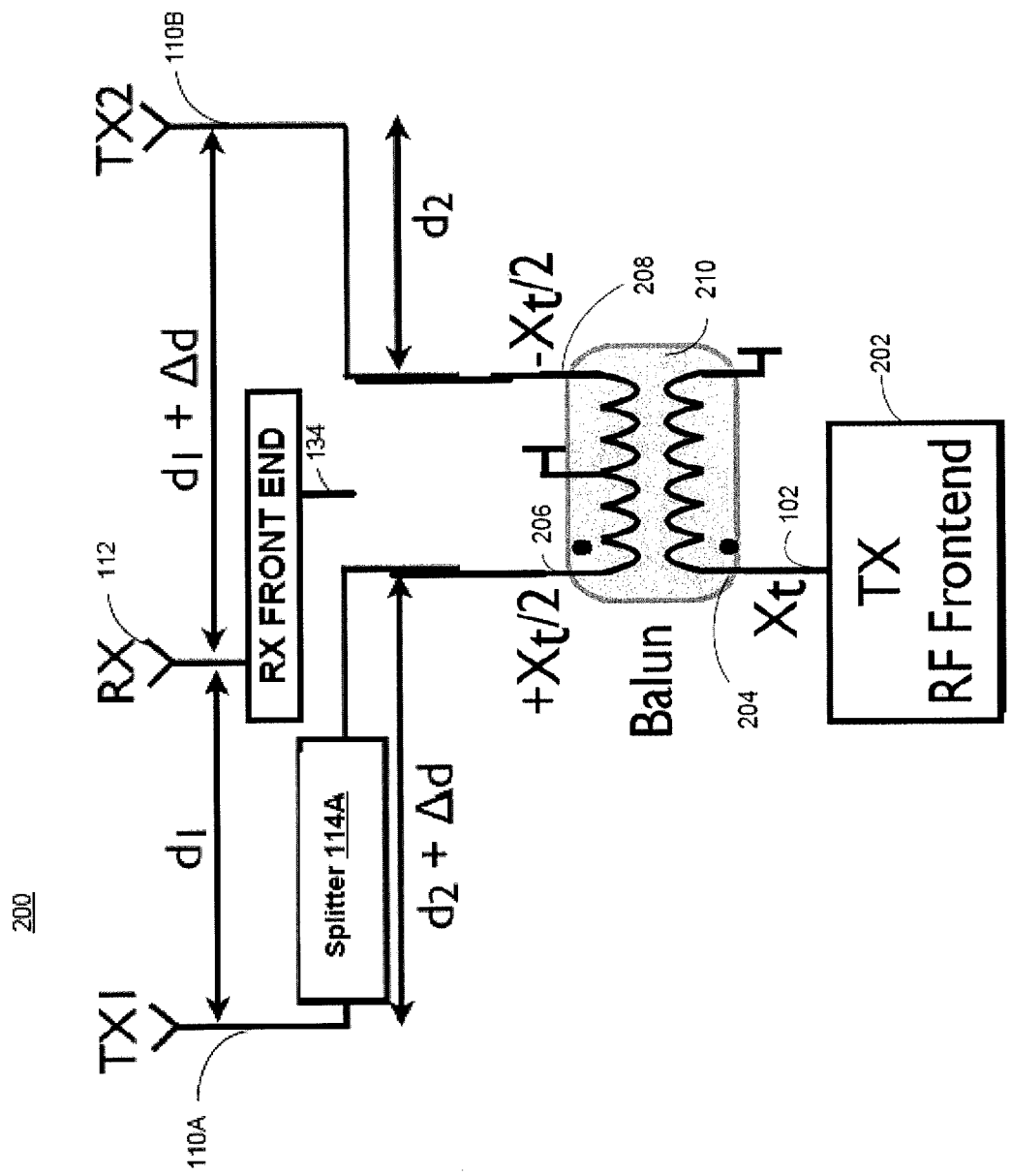
FIG. 2A depicts another example of a system configured in accordance with some exemplary embodiments described herein.

In some exemplary embodiments, the distance between the receive antenna 112 and the two transmit antennas 110A-B at a specific radio may differ by odd multiples of half the wavelength of the center frequency of transmission. FIG. 2A (which is further described below) depicts an example implementation of the antennas placed in accordance with the half wavelength. For example, if the central wavelength of transmission is represented by wavelength $\lambda$, and the distance of the receive antenna is distance d from a transmission antenna, then the other transmission antenna may be placed at a second distance $d+\lambda/2$ away from the receive antenna. This placement causes the self-interference signal from the antennas of transmitters 110A-B to add destructively at the antenna of receiver 112, causing attenuation of the self-interference signal received at receiver 112.

In some implementations, a portion of the distances between antennas may be implemented as lengths of RF wires or transmission lines connected to antennas.

In some implementations, the splitter 114A may attenuate the signal before transmission at 110A, so that the power of the signal transmitted by transmitter 110A is about matched, as measured at receiver 102, to the power of the signal transmitted at transmitter 110B. This matching may, in some implementations, achieve enhanced reduction of the self-interference at receiver 112.

Although the placement of the antennas may provide further reductions of the self-interference caused by transmitters 110A-B, antenna placement may not be sufficient. Moreover, in some implementations, the placement of the antennas as described with respect to FIG. 1 may not be possible, or implemented, in system 100. As such, the analog RF-based canceller 120 may be used, alone or in combination with antenna cancellation, to reduce some, if not substantially all, of the self-interference from transmitters 110A-B.

The analog RF-based canceller 120 may be configured to cancel some, if not substantially all, of the self-interference caused by the transmissions of transmitters 110A-B that are subsequently received at receiver 112. In some exemplary embodiments, the analog RF-based canceller 120 is implemented to offset the two input signals 116A-B to cancel some of the self-interference caused by transmitters 110A-B. For example, the analog RF-based canceller 120 may include a noise cancellation circuit, such as for example an Intersil QHx220 and the like, to offset (e.g., delay) an input signal at 116A (which represents an estimate of the transmit signal 102 subsequently received as self-interference). When this offset signal at 116A is processed (e.g., combined, filtered, etc.) with the received signal from input 116B, the analog RF-based canceller 120 may reduce some of the unwanted self-interference contained in the received signal obtained via receiver 112. For example, when the offset signal at 116A is summed with the input 116B, the resultant sum may reduce sum, if not all, of the self-interference.

The signal output 116C of the analog RF-based canceller 120 may be provided to an analog-to-digital converter 125, which provides a digital output to a digital canceller 130. The digital canceller 130 may receive digital baseband data from analog-to-digital converter 125 and receive digital transmit samples 132. The transmit samples 132 may correspond to buffered/stored digital samples of the self-interference (e.g., what was carried by transmit signal 102, transmitted via transmitters 110A-B, and then received as self-interference). Next, the digital canceller 130 processes the received digital data using digital noise cancellation techniques to remove from the received digital baseband data any unwanted self-interference. Digital noise cancellation (which is commonly used in headphones to remove ambient noise in audio) may also be used to remove noise from a digital signal.

Next, digital canceller 130 outputs digital data (labeled receive samples 134) representative of the signal of interest contained in the received signal 104 obtained at receiver 112. The receive samples 134 may then be further processed by, for example, decoding, and the like.

In some exemplary embodiments, the system 100 may include one or more of antenna cancellation, analog RF-based cancellation, and/or digital noise cancellation to reduce, if not substantially eliminate, unwanted self-interference caused by single channel full duplex transmit and receive at transmitters 110A-B and receiver 112.

The transmitters 110A-B may each be implemented as any type of radio frequency (RF) transmitter configured to transmit a signal, such as for example transmit signal 102. The transmitters 110A-B may further include one or more components, such as for example a filter, an amplifier, an antenna port, an antenna, and the like. The receiver 112 may be implemented as any type of RF receiver and may further include one or more components, such as for example a filter, an amplifier, an antenna port, an antenna, and the like.

The transmit signal 102 and the receive signal 104 may be implemented as any type of signal. However, in some implementations, the transmitted signal 102 may be configured as an RF signal in accordance with a wireless standard or technology, such as for example Wideband Code Division Multiple Access (W-CDMA), Long Term Evolution-Advanced, WiFi, and the like.

The analog RF-based canceller 120 may be configured to reduce, if not substantially remove, the self-interference caused by the full duplex transmit and receive over a single frequency channel. In some implementations, the analog RF-based canceller 120 performs the cancellation in the analog, radio frequency domain to enable reduction/removal of self-interference in a higher dynamic range environment, when compared to digital, baseband cancellation. For example, digital noise cancellation operates in the digital domain but operates with a dynamic range limited by the number of bits being processed. The digital noise cancellation provided by digital canceller 130 may not have sufficient dynamic range to remove large amounts of self-interference, and such a dynamic range limitation is not present in the analog RF-based canceller 120. As such, the analog RF-based canceller 120 may have a wider dynamic range and thus be capable of removing a larger amount of self-interference from the received signal, when compared to the noise reduction capability of digital canceller 130. Moreover, the analog RF-based canceller 120 may perform the cancellation in the analog RF domain to enable reduction/removal over a wider bandwidth, when compared to solely using antenna cancellation. In some exemplary embodiments, the system 100 may include the analog RF-based cancellation, alone or in combination with one or more of antenna placement-based cancellation and/or digital noise cancellation.

The analog-to-digital converter 125 may be implemented as any type of analog-to-digital converter capable of processing the analog RF output 116C provided by analog RF-based canceller 120. In some implementations, the analog-to-digital converter 125 may consist of a first stage converting an RF analog signal to a baseband or an intermediate frequency (IF) analog signal and a second stage converting the output signal of the first stage to a baseband or IF digital signal. In some implementations, the digital canceller 130 may be implemented as a digital noise canceller, such as for example a finite impulse-response (FIR) filter that models the self-interference channel from the transmitter to the receiver.

In some exemplary embodiments, the analog RF-based canceller 120 is configured to reduce and/or remove the self-interference based on signal inversion rather than an offset. For example, an inverted version of the transmit signal may be generated and used as a reference signal. The reference signal is then combined with the received signal to reduce and/or remove the self-interference caused by the single channel full duplex transmit and receive at transmitters 110A-B and receiver 112. Moreover, the signal inversion used by the analog RF-based canceller 120 may cancel the self-interference signal irrespective of the bandwidth or the frequency. In some exemplary embodiments, the analog RF-based canceller 120 may include passive transformer circuits to generate the signal inversion. An example of a passive transformer circuit is a balanced-to-unbalanced converter, which are also referred to as a Balun and/or a signal inverter.

FIG. 2A depicts an example system 200 including an analog RF-based canceller based on signal inversion. The description of FIG. 2A also refers to FIG. 1. The system 200 includes a transmitter RF front end 202 that provides the transmit signal 102 to signal inverter 210. The signal inverter 210 receives at 204 the transmit signal 102 and then generates outputs 206 and 208. The output 206 is a positive version of the transmit signal 102, and the output 208 is a negative version of the transmit signal 102. The signal inverter output 206 is coupled to splitter 114A (which may further include attenuation) and transmitter 110A, and the signal inverter output 208 is coupled to transmitter 110B. At receiver 112, the transmission from 110A and 110B are inverted such that the transmitted signals 110A-B cancel each other at receiver 112, reducing, if not substantially removing the self-interference.

Figure 2B:
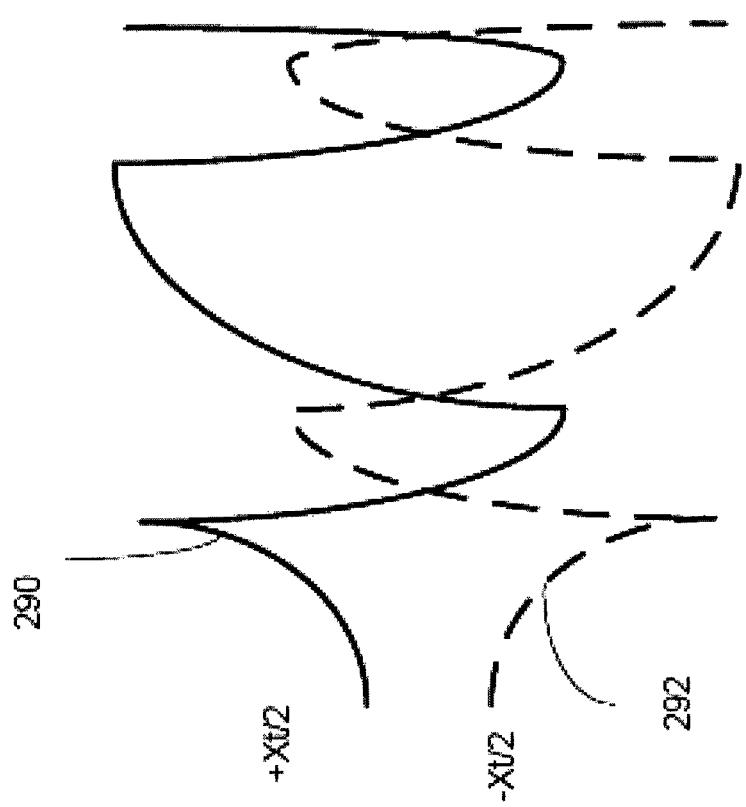
FIG. 2B depicts example plots of inverted signals.

To illustrate signal inversion, FIG. 2B depicts an example of a first signal 290 (solid line) generated by signal inverter 210, and then output via 206, splitter 114A, and transmitter 110A. FIG. 2B also depicts an example of an inverted signal 292 (dashed line) generated by signal inverter 210, and then output via 208 and transmitter 110B. At receiver 112, the signals 290 and 292 transmitted by 110A-B cancel each other, thus reducing, if not substantially removing the self-interference at receiver 112.

Figure 3A:
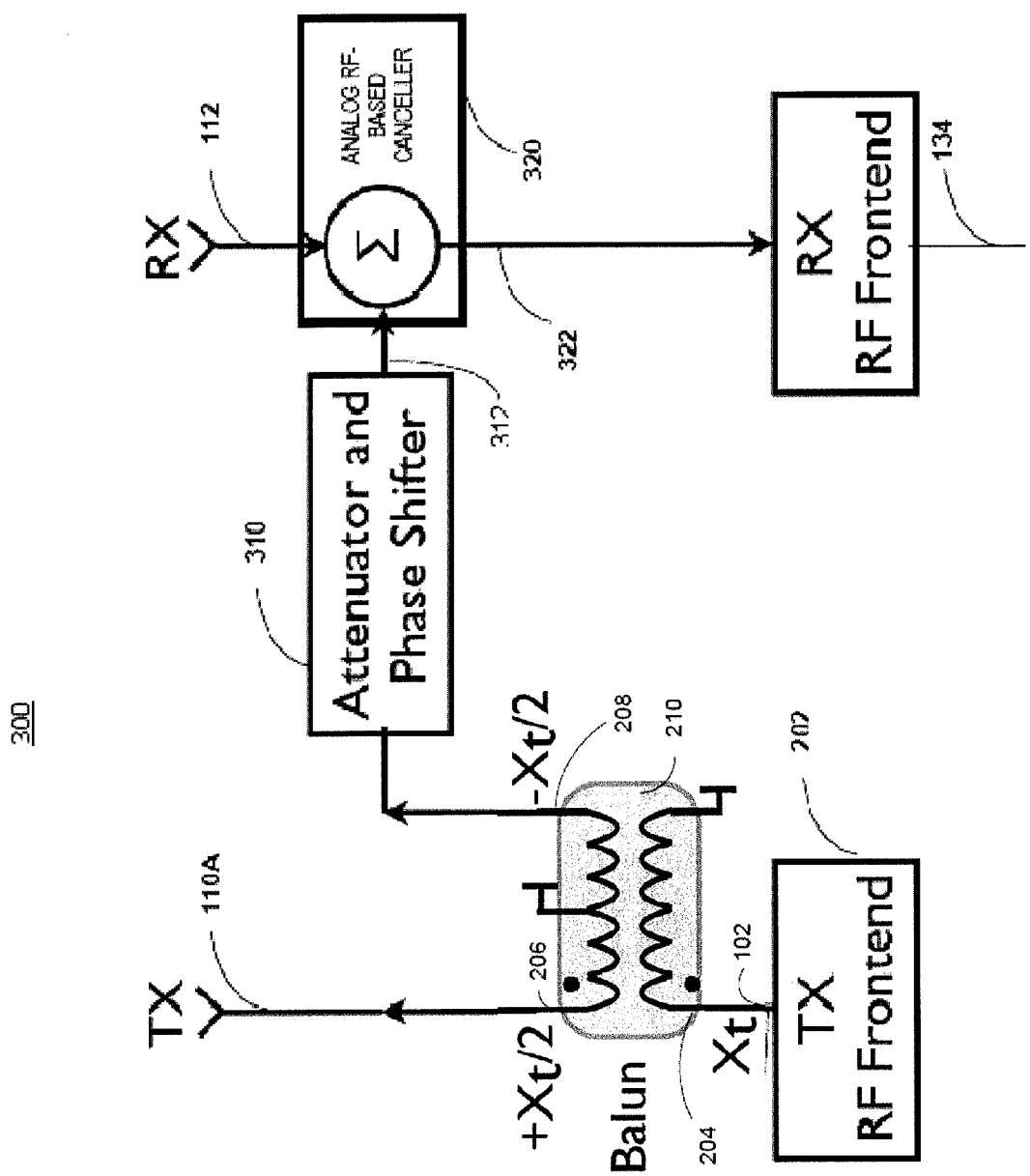
FIG. 3A depicts another example of a system configured in accordance with some exemplary embodiments described herein.

FIG. 3A depicts another system 300. System 300 is similar to system 200 but includes an attenuator and phase shifter 310. System 300 further includes a hard (or wired) cancellation path, rather than an over the air cancellation path. Referring to FIG. 3A, the transmitter RF front end 202 provides the transmitted signal 102 to signal inverter 210, where outputs 206 and 208 are generated as described above with respect to FIG. 2A. The signal inverter output 206 is coupled to transmitter 110A, and the signal inverter output 208 generates an inverted, negative signal, which is coupled to the attenuator and phase shifter 310.

The attenuator and phase shifter 310 may include a variable RF delay line (or a phase shifter) and a variable RF attenuator. The attenuator and phase shifter 310 is adjusted to generate a cancellation signal over the wire path (e.g., path 208 to 312) that substantially matches the self-interference signal received over the air (e.g., from 110A to receiver 112). To match signals 312 and 112, the phase of the attenuator and phase shifter 310 may be tuned. When the cancellation signal 312 from the wire path is combined at 320 with the self-interference signal received at 112 from the air path, the output 322 of the analog RF-based signal canceller 320 may reduce, if not substantially eliminate, the self-interference signal, providing thus an output 322 with reduced/eliminated unwanted self-interference caused by single channel full duplex operation of system 300.

Figure 3B:
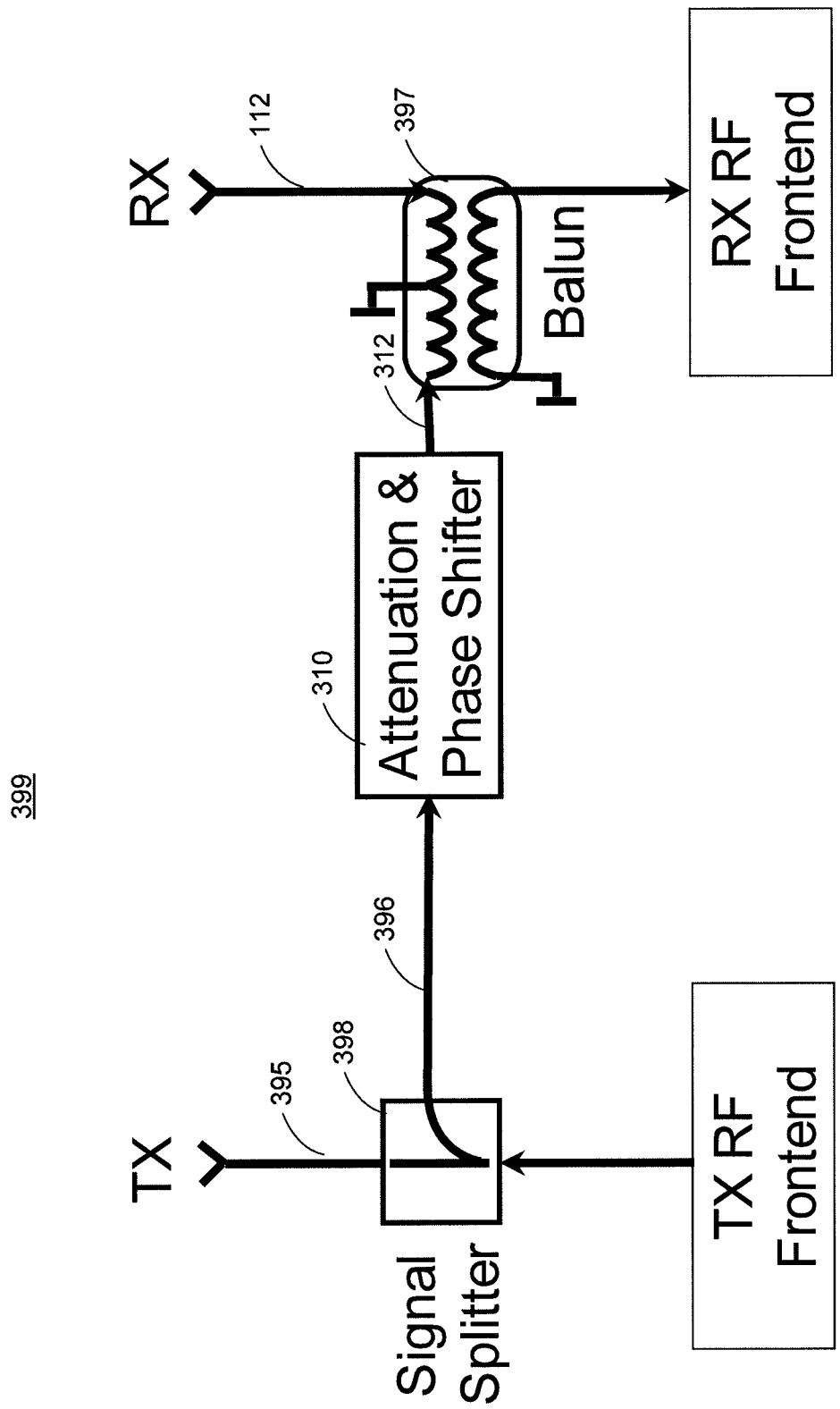
FIG. 3B depicts another example of a system configured in accordance with some exemplary embodiments described herein.

FIG. 3B depicts an example of a system 399 for full duplex wireless communications. System 399 is similar to system 300 but uses balun 397 as an analog subtraction circuit to subtract the cancellation signal 312 from the self-interference signal received over the air via receiver 112. In this example, a signal splitter 398 is used at the transmit side to generate the transmit signal 395 and cancellation signal 396 having the same, or similar, polarity instead of the inverted polarity of the system 300.

Figure 4:
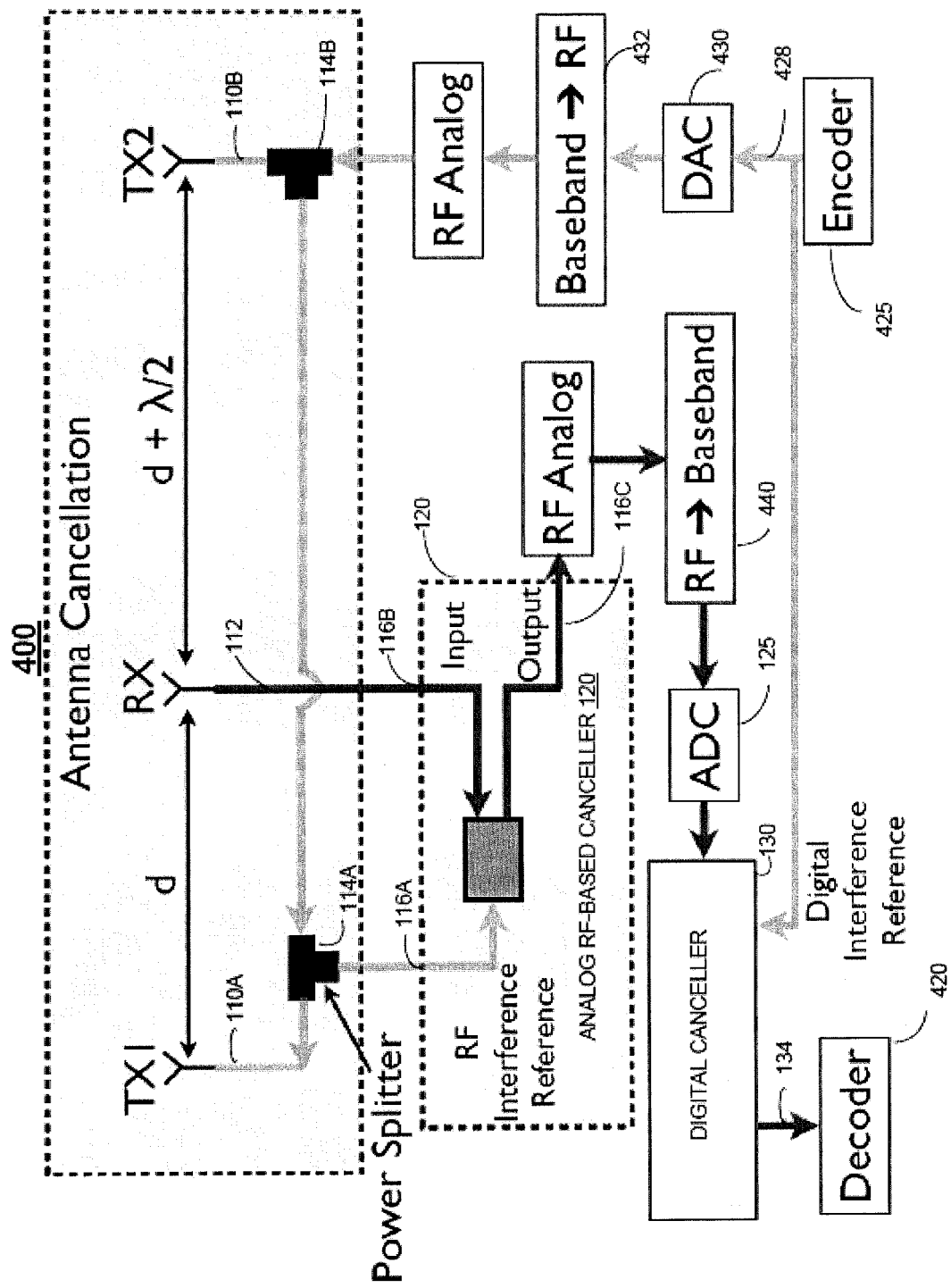
FIG. 4 depicts another example of a system configured in accordance with some exemplary embodiments described herein.

FIG. 4 depicts another example of a system 400 for full duplex wireless communications. The system 400 is similar to system 100 in some respects but system 400 includes additional features as described herein. An encoder 425 may encode data and then provide an output 428 to digital-to-analog converter 430. The encoder 425 may also provide the encoded data to digital canceller 130, where the encoded data serves as a reference for digital noise cancellation. The output of the digital-to-analog converter 430 may be up converted 432 to RF to form an analog RF signal, which is transmitted via antennas 110A-B. The analog RF-based canceller 120 processes inputs 116A-B to generate an output 116C. The output 116C of the analog RF-based canceller 120 is down converted to baseband 440. Next, the baseband signal is provided to analog-to-digital converter 125, and the output of the analog-to-digital converter 125 is coupled to the digital noise canceller 130 for additional reduction of the self-interference. The output of the digital noise canceller 130 is coupled to decoder 420, where decoding forms a decoded digital bit stream for further processing.

Figure 5:
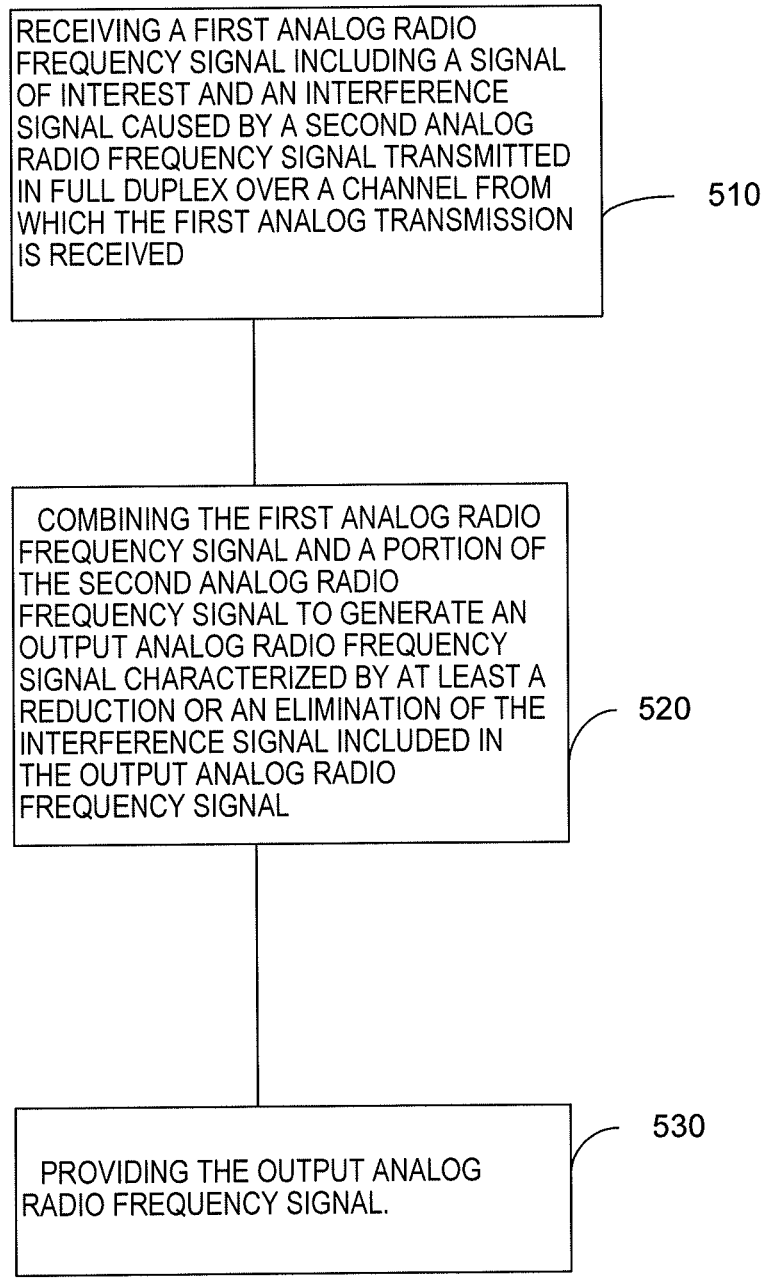
FIG. 5 depicts an example of a process configured in accordance with some exemplary embodiments described herein.

FIG. 5 depicts an example process 500 for single channel full duplex wireless communications. The description of FIG. 5 also refers to FIGS. 1, 2A, and 3.

At 510, a first analog radio frequency signal may be received. The first analog radio frequency signal may include a signal of interest and an interference signal caused by a second analog radio frequency signal transmitted in full duplex over the channel from which the first analog radio frequency signal is received. For example, receiver 112 may receive a first analog radio frequency signal including a signal of interest (e.g., a signal transmitted by another device, such as for example a radio, cell phone, base station, Wi-Fi wireless access point, back-haul point-to-point links, and the like). The first analog radio frequency signal may also include an interference signal (which is also referred to herein as the self-interference signal). This interference signal may be caused by transmissions from at least one of transmitters 110A-B, which are subsequently carried by a single frequency channel and then received by receiver 112. Because the transmissions and receptions are full duplex and occur over the channel, the receiver 112 receives the self-interference signal along with the signal of interest.

At 520, the received first analog radio frequency signal and a portion of the second analog radio frequency signal may be combined to generate an output analog radio frequency signal. This output analog radio frequency signal may be characterized by at least a reduction, or an elimination of, the self-interference signal caused by the reception at 112 of the second analog radio frequency signal. For example, the analog RF-based canceller 120 may include a first input 116A having a portion of the transmit signal 102 and a second input 116B having the received signal 104. The analog RF-based canceller 120 may combine, based on signal inversions and/or signal offset, the signals at inputs 116A-B to generate the output analog radio frequency signal at 116C. The output 116C may be characterized as having a reduction, or an elimination of, the self-interference signal, when compared to the amount of self interference present in the receive signal obtained from 112 and 116B.

At 530, the output analog radio frequency signal may be provided as an output. For example, the analog RF-based canceller 120 may provide an output 116C characterized by a reduction, or an elimination of, the self-interference. The output 116C may be provided to additional components for processing. For example, output 116C may be processed by digital canceller 130. Moreover, in some implementations, the antennas may be positioned to enable antenna placement-based cancellation as described above. When this is the case, the received signal at 104 may include a self-interference signal reduced by placing the antennas of transmitters 110A-B and receiver 112 in locations that cause destructive interference of the signals transmitted by transmitters 110A-B.

Although the full duplex mechanisms described herein may be used in a variety of systems, methods, and the like, in some exemplary embodiments, the full duplex mechanisms are implemented in multiple input, multiple output (MIMO) transmission systems. The following description refers to some examples of those MIMO implementations.

In MIMO systems, multiple transmit antennas may be used to transmit independent streams over the same frequency channel. These MIMO systems often characterize the radio channel to enable the transmission over the multiple antennas. Further, MIMO systems may precisely control the phase and amplitude (or power) at each antenna. In any case, the single channel full duplex mechanisms described herein may be used in conjunction with MIMO as further described below.

To illustrate by way of example, a 2 ×2 MIMO system may provide 2 independent streams each transmitted simultaneously over a separate transmitter. Likewise, a 3×3 MIMO system can have each of its 3 transmit antennas send an independent data stream to one of the three receive antennas. The MIMO system may also use multiple antennas to improve the signal-to-noise ratio (and therefore bit rate or reliability) of a single stream. MIMO transmit antennas may use constructive interference to increase signal strength at the receiver, while a MIMO receiver combines signals from multiple input antennas. However, to achieve these gains, MIMO systems determine an estimate of the radio channel for each of the antennas. For example, a MIMO system may determine an estimate of the radio channel at the receiver and feedback the estimate to the transmitter, where the feedback is used to determine the MIMO precoding used for each of the transmit antennas.

Figure 6:
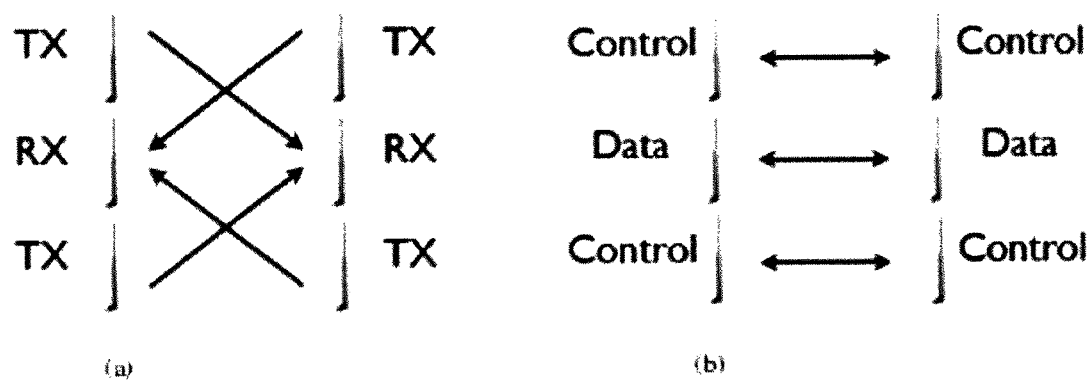
FIG. 6 depicts examples of MIMO configurations using a single data channel and a single control feedback channel.

The MIMO receiver typically waits until after a transmission to provide the feedback. In some exemplary embodiments, the single channel full duplex mechanisms described herein may enable the receiver to provide prompt feedback to the transmitter, enhancing the value of such feedback in highly mobile systems. In some implementations, a 3-antenna system may be configured as depicted in FIG. 6. FIG. 6 depicts using two antennas for control traffic and a single antenna for data. To illustrate further, a transmitter may use a data antenna to send a data stream to the data antenna of another device. At the same time, the control antennas of that receiver can promptly send as feedback channel state information to the control antenna of the transmitter. The transmitter is then able to adapt its MIMO transmission based on the received feedback.

Figure 7:
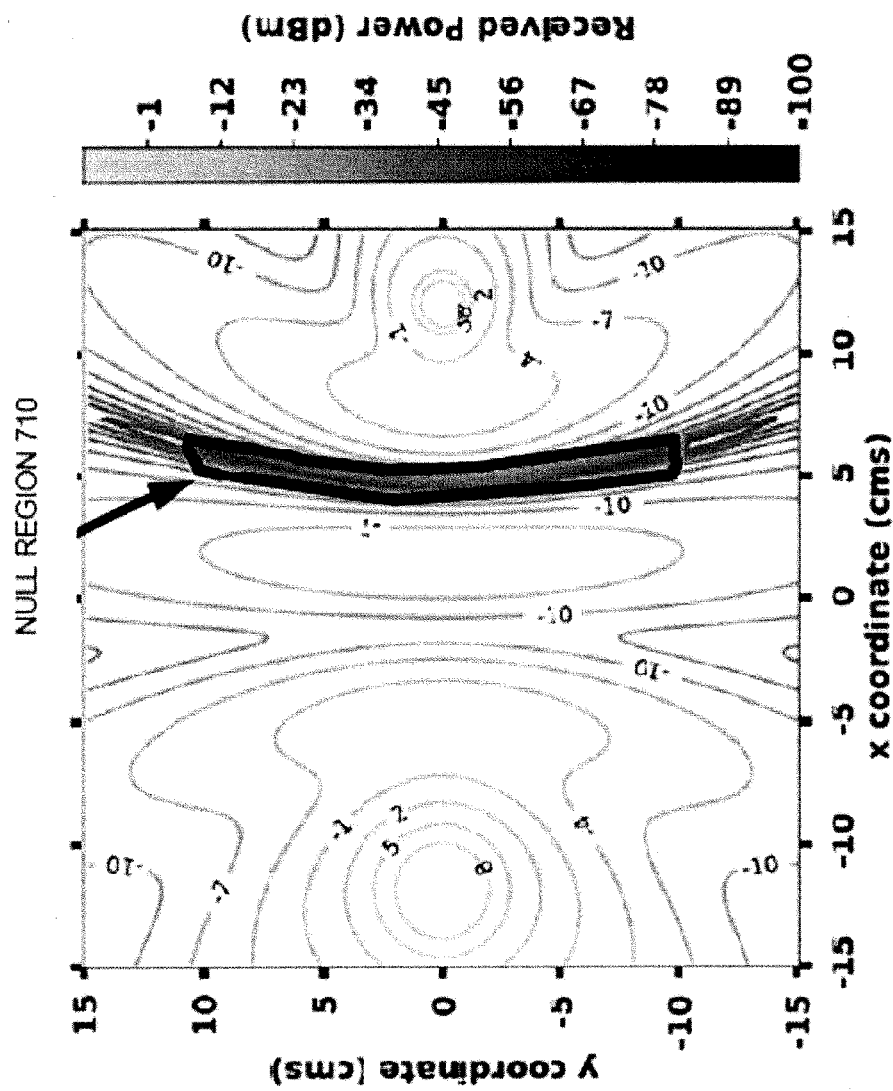
FIG. 7 depicts a null region.

FIG. 7 shows an example of a contour map 700 of received power with two transmit antennas. The region 710 represents a very strong destructive interference spanning more than 20 cm. Antennas placed anywhere in this region 710 may observe the 30-35 dB reduction in self-interference. In some implementations, the data antenna of FIG. 6 may be implemented as MIMO antennas placed within region 710 but these MIMO antennas may also be restricted to half wavelength spacing. In exemplary implementations operating in the 2.4 GHz band, up to 4 MIMO data antennas may be placed in the 20 cm null region 710 of FIG. 7, although other frequencies and null region configurations may be used as well.

Figure 8:
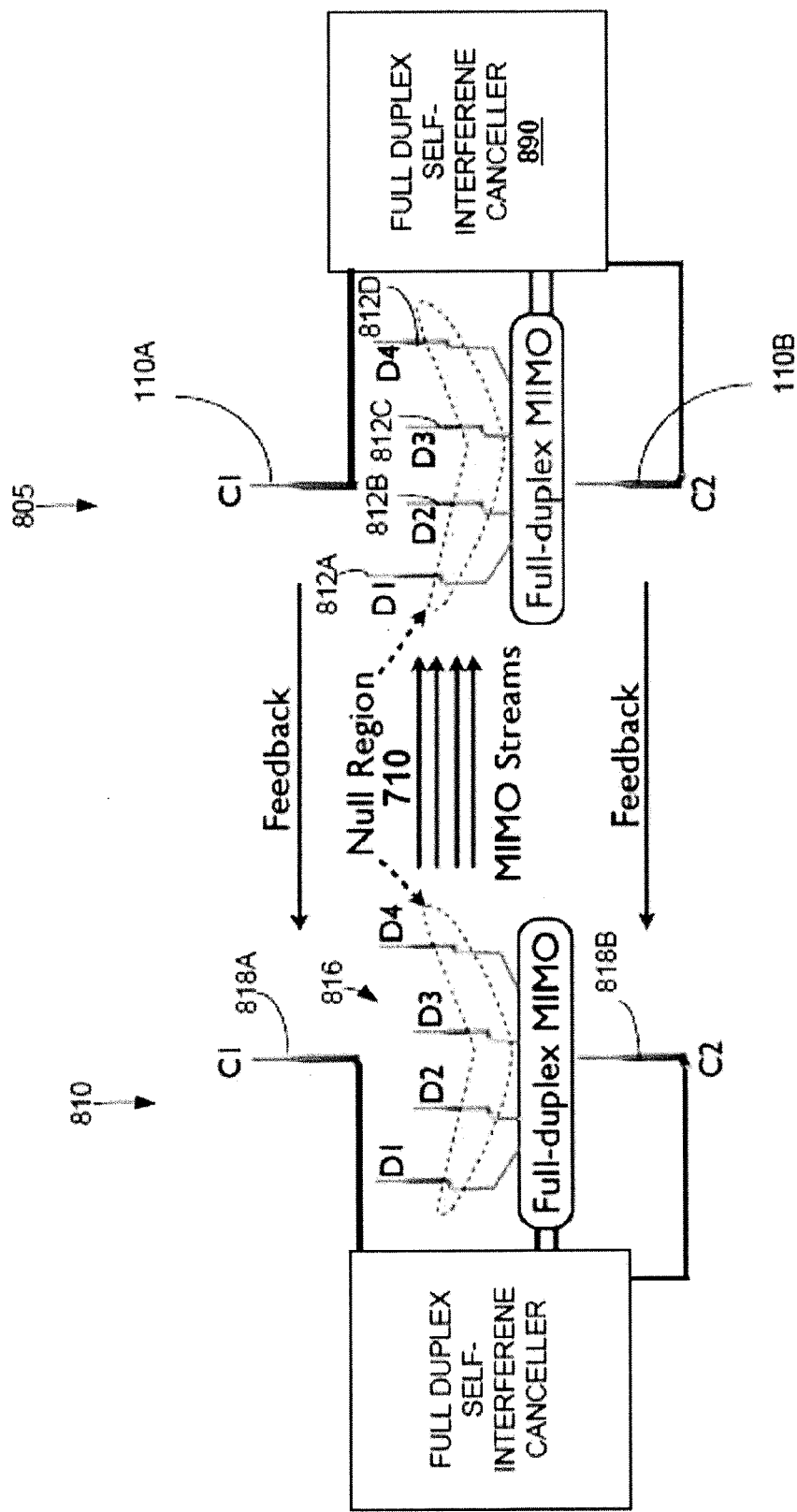
FIG. 8 depicts an example of a MIMO-based system configured in accordance with some exemplary embodiments described herein.

FIG. 8 shows an example implementation of a system including a first system 805 and a second system 810, each of which is configured to operate in accordance with MIMO and the single channel full duplex mechanisms described herein which are configured to reduce, if not eliminate, self-interference. The first and second systems 805 and 810 may be implemented in a manner similar to systems 100, 200, 300, and 399, but may further include additional features as described herein. The system 805 may include transmitters 110A-B including antennas configured to transmit control traffic, such as for example feedback including channel state information used in connection with MIMO system. The system 805 may include receivers 812A-D including antennas for receiving MIMO streams transmitted by system 810. The antennas associated with 812A-D may be positioned in accordance with null regions 710, enabling antenna placement-based cancellation. Furthermore, the systems 805 may include a full duplex self interference noise canceller 890 configured to include one or more of antenna cancellation, analog RF-based cancellation, and digital noise cancellation as described herein to cancel self-interference from transmission from transmitters 110A-B. System 810 may be implemented in a manner similar to system 805.

Referring again to transmitters 812A-D, the antennas are placed in the null region 710. In operation, the antennas of receiver 812A-D receive data, and the control antennas of transmitters 110A-B transmit real-time feedback. Similarly, at system 810, the data antennas 816 send data, and the control antennas 818A-B receive feedback. The symmetry of the antenna configuration of FIG. 8 means that, just as the combined transmit signal of control antennas 110A-B cancel at data antenna 812A-D, combining the receive signal of the control antennas 818A-B cancels the signals of all of the data antennas. Moreover, the control antennas may also be configured as a MIMO array. In that case, the data antennas and the control antennas are all in transmit or receive mode at the same time, and MIMO processing may use the control antennas as additional MIMO channels.

Although FIG. 8 depicts an example configuration, the configuration may be extended, in some implementations, to include additional duplex channels. In some implementations, a three-dimensional arrangement of antennas may be configured to allow a MIMO system having multiple streams in both directions. For example, a set of data antennas may be placed on a circle in a plane, and another set of antennas may be placed on a line perpendicular to that plane and passing through the center of the circle. The full duplex mechanisms described herein configured in accordance with MIMO may thus enable real-time, in-band feedback (or a control channel) in the reverse direction and a high-speed forward direction data channel.

In some exemplary embodiments, the single channel full duplex mechanisms described herein for cancelling/reducing self-interference may also be implemented with one or more of the following aspects: an interspersing of control and data bits in a packet, wireless resource allocation, single-hop packet scheduling, rate adaptation and recovery, and co-existence with other wireless technologies.

Figure 9:
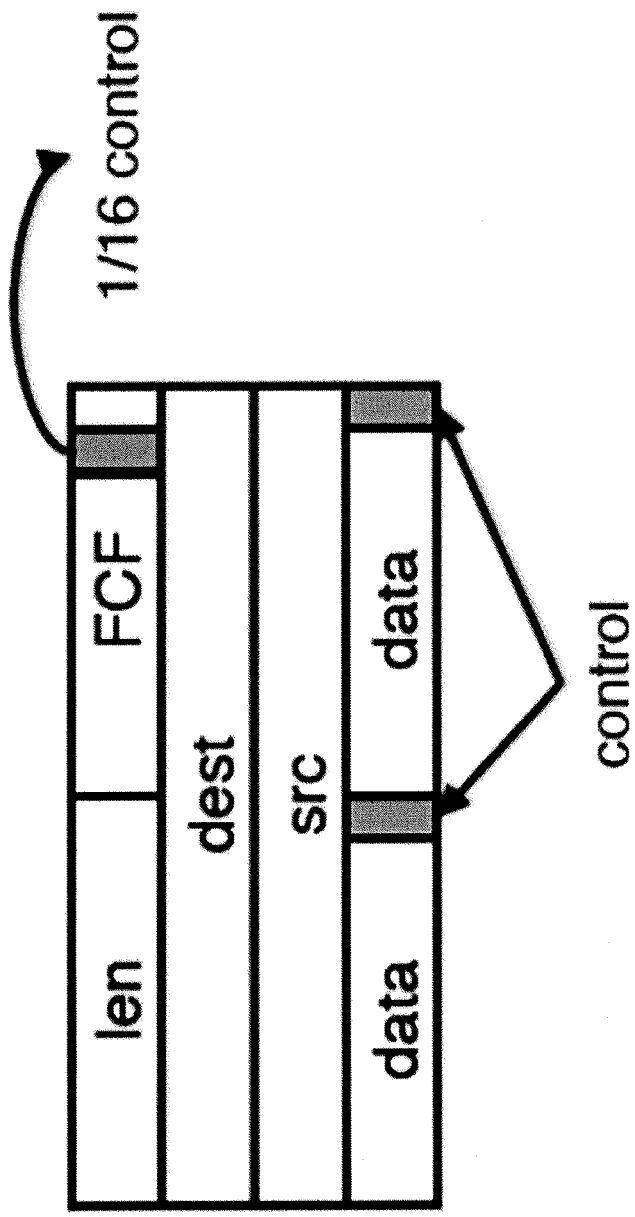
FIG. 9 depicts examples of interspersed control bits in accordance with some exemplary embodiments described herein.

The concurrent bidirectional links provided by single channel (also referred to herein as single frequency channel) full duplex nodes may be used to exchange real-time control information. Unlike half-duplex systems, where control bits are typically embedded at the beginning or end of a packet, in single channel full duplex systems, control bits may be interspersed within a packet, as depicted at FIG. 9. For example, a frame control field (FCF) may be used to describe how much of a packet is control information using a simple binary fraction: 0 bits, every 1024th bit, every 512nd bit, every other bit, etc. These control bits may be interspersed with data bits. For example, if a full duplex node sends 750 bytes of data, the full duplex link layer may include a control bit at every 16th bit. FIG. 9 shows an example of such a link layer frame format made possible by single channel full duplex mechanisms described herein.

The single channel full duplex radios (such as for example systems 100, 200, 300, 399, 400, 805, and/or 810) may enable radio nodes to transmit and receive at the same time over the same channel. In some implementations, a full duplex radio node A initiates a single channel full duplex transmission to another full duplex radio node B. This initiated transmission is referred to herein as a lead transmission. Node B may then either send data back to node A, or send/forward data to another node in the network. Node B's transmission is referred to herein as a synchronous transmission, since it is triggered by, and happens at the same time as the lead transmission. In some exemplary embodiments, the media access control (MAC) layer of systems described herein may be scheduled in accordance with the lead and synchronous transmissions. MIMO systems generally require that some form of channel state information representative of the state of the radio channel be made available for the transmitter in order to perform MIMO precoding and the like. Moreover, MIMO resource allocation algorithms typically require the transmitter to have the channel gain matrix in order to compute the power allocation. However, the channel gain matrix is observed at the receiver. The need to communicate channel state information from the receiver to the transmitter in a timely fashion places a significant burden on uplink capacity in most MIMO systems. In some exemplary embodiments, the single channel full duplex mechanisms described herein may be used to alleviate this burden based on, for example, the lead and synchronous transmissions described herein.

Regarding rate adaptation and error recovery, modern wireless transmitters use variable rates at the physical layer to maximize the utility of the wireless channel. The transmitter takes feedback from receivers for past transmissions to form a best guess the current wireless channel state. As wireless channels tend to be highly variable in nature, systems may use either conservative heuristics to ensure a high packet success rate, or use higher layer mechanisms, such as for example retries. Single channel full duplex may, in some implementations, provide more accurate rate adaptation schemes for better packet success rates and more efficient error recovery schemes when packets fail. For example, packet reception ratio (PRR) based rate adaptation schemes may use packet success ratios, based on received acknowledgments, to estimate the link quality. While it is implementable with the current 802.11 WiFi standard, mechanisms configured to measure PRR may not be able to distinguish packet losses due to low signal to noise ratio (SNR) and high interference.

Real-time feedback provided by the single channel full duplex MIMO systems described herein may enable in-packet rate adaptation. According to the value of SNR or bit error rate (BER) that a receiver feeds back using the synchronous transmission, the transmitter can immediately change the data rate of the current transmission. In this way, the transmitter can fully exploit the current capacity of wireless links and real-time feedback may facilitate sending real-time retransmission requests.

With respect to co-existence, the unlicensed wireless band in 2.4 GHz is increasingly crowded. Many commercial wireless technologies, such as for example IEEE 802.11, IEEE 802.15.4, and cordless phones, operate in this band. However, devices using these protocols may be designed to work well with other devices using the same protocol, but tend to degrade significantly when co-located with devices using a different protocol. For example, the performance of IEEE 802.15.4 tends to degrade significantly due to the high power interference of 802.11 nodes and vice versa. This is a consequence of devices that cannot sense other transmissions in the wireless channel while transmitting, and thus interfere with each other's transmissions. Single channel full duplex may, in some implementations, eliminate this interference, since a transmitter can sense a device even if it is operating a different protocol, and can then take the appropriate action to gracefully co-exist.

Figure 10:
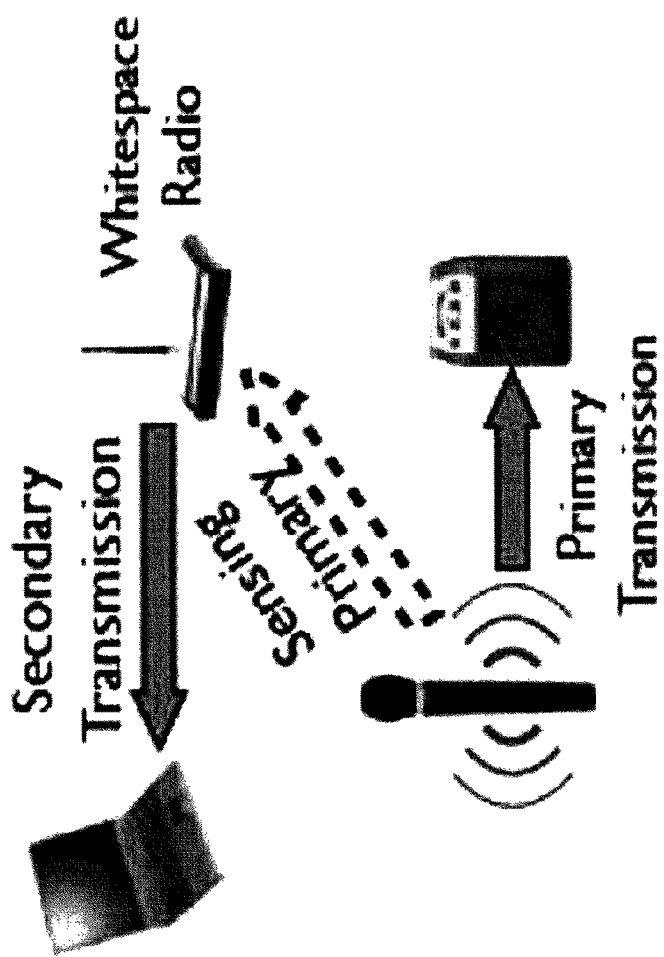
FIG. 10 depicts an example of secondary whitespace radio.

FIG. 10 shows an example of a secondary whitespace radio co-existing with a primary wireless device, such as for example a wireless microphone. Without a full duplex antenna as described herein, secondary transmitters need to be very conservative in when they choose to transmit. It is not necessarily safe for the secondary transmitter to emit even when the channel is sensed as vacant because they must account for the possibility that the primary might begin transmitting in the middle of their transmissions. This limits the utility extractable from vacant spectrum. By inferring the statistical properties of primary occupancy, smarter secondary strategies can be used, but the basic problem remains. A single channel full duplex system may, in some implementations, alter this balance because the secondary transmitters can sense primary activity even while they are transmitting and quickly vacate the spectrum. This ability will allow for significantly more efficient and robust use of the vacant spectrum.

Although the description above provided specific examples of the placement of antennas in order to cause cancellation, antenna placement cancellation may be implemented with different antenna configurations as well and still achieve self-interference reduction/elimination. For example, instead of using two transmit antennas and one receive antenna, the arrangement may be reversed with the same effect, e.g., one transmit antenna placed at a distance d from one receive antenna and distance $d+\lambda/2$ from another receive antenna. In this configuration, the receive signal may be attenuated for the first receive antenna by a certain value and then the two signals may be added using an RF combiner. Since this arrangement is the exact reciprocal of the two transmit antennas example noted above, the self-interference cancellation effect on the received signal is the same. Other arrangements of antennas are also possible for getting signal cancellation. Although the above description mentioned specific frequency bands, such as for example the 2.4 GHz frequency band, the subject matter described herein may be used at other frequencies as well.

The full duplex mechanisms described herein may be used in a variety of implementations. In some implementations, user equipment, base stations, base station-to-base station backhaul radios, point-to-point radios, Wi-Fi wireless access points, and wireless network access points may be configured in accordance with the duplex single channel mechanisms described with respect to systems 805 and 810, as well as systems 100, 200, 300, and 399.

For example, user equipment may be configured with the full duplex mechanisms described herein. The user equipment may be mobile and/or stationary. Moreover, the user equipment may be referred to as, for example, devices, mobile stations, mobile units, subscriber stations, wireless terminals, terminals, tablets, and/or any other device including wireless access. In some cases, the user equipment may include one or more of the following: at least one processor, at least one computer-readable storage medium (e.g., memory, storage, and the like), a user interface, and radio access mechanisms, and one or more mechanisms described herein.

The subject matter described herein may be embodied in a system, apparatus, method, and/or article depending on the desired configuration. For example, the systems described herein and/or the processes described herein may be implemented using one or more of the following: at least one processor and at least one memory configured to allow the at least one processor to execute program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) may include machine instructions for a programmable processor, and may be implemented in a high-level procedural and/or object-oriented programming language, and/or in assembly/machine language. As used herein, the term "machine-readable medium" refers to any computer program product, computer-readable medium, computer-readable medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. For example, the implementations described above may be directed to various combinations and subcombinations of the disclosed features and/or combinations and subcombinations of several further features disclosed above. As used herein, the phrase "based on" means "based on at least." In addition, the logic flow depicted in the accompanying figures and/or described herein does not require the particular order shown, or sequential order, to achieve desirable results. Other embodiments may be within the scope of the following claims.

What is claimed:

1. A method for self-interference cancellation comprising:
sampling a digital transmit signal of a communication system;
converting the digital transmit signal into a radio frequency (RF) transmit signal; wherein the RF transmit signal is an analog signal having a first center frequency; wherein the first center frequency is a radio frequency;
sampling the RF transmit signal;
transmitting, at a set of transmit antennas of the communication system, the RF transmit signal;
receiving, at a set of receive antennas of the communication system, an RF receive signal of the communication system; wherein the RF receive signal is an analog signal having a second center frequency; wherein the second center frequency is identical to the first center frequency;
wherein the set of transmit antennas and the set of receive antennas are configured such that destructive interference removes a first portion of self-interference from the RF receive signal;
transforming, in the RF domain and without performing frequency downconversion, the sampled RF transmit signal into an RF self-interference cancellation signal; wherein transforming the sampled RF transmit signal comprises attenuating, phase shifting, time delaying, and inverting the RF transmit signal;
combining, over a wired cancellation path, in order to remove a second portion of self-interference from the RF receive signal, the RF self- interference cancellation signal with the RF receive signal, resulting in a reduced-interference residual RF receive signal;
converting the reduced-interference residual RF receive signal into a reduced-interference residual digital receive signal;
transforming, in the digital domain, the sampled digital transmit signal into a digital self-interference cancellation signal using digital noise cancellation techniques; and
combining, in order to remove a third portion of self-interference from the reduced-interference residual digital receive signal, the digital self-interference cancellation signal with the reduced-interference residual digital receive signal, resulting in a further-reduced-interference residual digital receive signal.

2. The method of claim 1, wherein the set of transmit antennas comprises a first transmit antenna and a second transmit antenna; wherein the set of receive antennas comprises a receive antenna; wherein the first transmit antenna and the receive antenna are separated by a first distance; wherein the first distance is finite and non-zero; wherein the second transmit antenna and the receive antenna are separated by a second distance; wherein the second distance is a sum of the first distance and an odd multiple of one half of a center wavelength of the RF transmit signal.

3. The method of claim 1, wherein the set of receive antennas comprises a first receive antenna and a second receive antenna; wherein the set of transmit antennas comprises a transmit antenna; wherein the first receive antenna and the transmit antenna are separated by a first distance; wherein the first distance is finite and non-zero; wherein the second receive antenna and the transmit antenna are separated by a second distance; wherein the second distance is a sum of the first distance and an odd multiple of one half of a center wavelength of the RF receive signal.

4. The method of claim 1, wherein the set of transmit antennas comprises a first transmit antenna and a second transmit antenna; wherein transmitting the RF transmit signal comprises delaying transmission of the RF transmit signal at the second transmit antenna relative to transmission of the RF transmit signal at the first transmit antenna; wherein delaying transmission comprises delaying transmission such that destructive interference removes the first portion of self-interference from the RF receive signal.

5. The method of claim 1, wherein inverting the RF transmit signal comprises inverting the sampled RF transmit signal using a balun.

6. A method for self-interference cancellation comprising:
sampling a radio frequency (RF) transmit signal; wherein the RF transmit signal is an analog signal having a first center frequency; wherein the first center frequency is a radio frequency;
transmitting, at a transmit antenna of a communication system, the RF transmit signal;
receiving, at a receive antenna of the communication system, an RF receive signal of the communication system; wherein the RF receive signal is an analog signal having a second center frequency;
transforming, in the RF domain and without performing frequency downconversion, the sampled RF transmit signal into an RF self-interference cancellation signal; wherein transforming the RF transmit signal comprises attenuating, phase shifting, time delaying, and inverting the RF transmit signal; and
combining, over a wired cancellation path, in order to remove a first portion of self-interference from the RF receive signal, the RF self-interference cancellation signal with the RF receive signal, resulting in a reduced-interference residual RF receive signal;
after sampling the RF transmit signal, converting the sampled RF transmit signal into an RF-sourced digital transmit signal;
transforming, in the digital domain, the RF-sourced digital transmit signal into a digital self-interference cancellation signal using digital noise cancellation techniques;
converting the reduced-interference residual RF receive signal into a reduced-interference residual digital receive signal; and
combining, in order to remove a second portion of self-interference from the reduced-interference residual digital receive signal, the digital self-interference cancellation signal with the reduced-interference residual digital receive signal, resulting in a further-reduced-interference residual digital receive signal.

7. The method of claim 6, wherein the transmit antenna is also the receive antenna.

8. The method of claim 6, wherein transforming the sampled RF transmit signal comprises transforming the sampled RF transmit signal using a variable RF attenuator and a variable RF phase shifter; the method further comprising tuning the variable RF attenuator and variable RF phase shifter to reduce self-interference in the reduced-interference residual RF receive signal.

9. The method of claim 8, wherein inverting the sampled RF transmit signal comprises inverting the sampled RF transmit signal using a balun.

10. A system for self-interference cancellation comprising:
a transmitter, coupled to a set of transmit antennas, that transmits a radio frequency (RF) transmit signal having a first center frequency; wherein the first center frequency is a radio frequency; wherein the transmitter creates the RF transmit signal from a digital transmit signal;
a signal splitter, communicatively coupled to the RF transmit signal, that samples the RF transmit signal to create a sampled RF transmit signal;
a receiver, coupled to a set of receive antennas, that receives an RF receive signal having a second center frequency; wherein the second center frequency is a radio frequency;
an RF self-interference canceller, coupled to the signal splitter, that transforms, in the RF domain and without performing frequency downconversion, the sampled RF transmit signal into an RF self-interference cancellation signal; wherein the RF self-interference canceller comprises an attenuator, an inverter, and at least one of a phase-shifter and a delay;
a signal combiner, communicatively coupled to the RF self-interference cancellation signal and to the RF receive signal by wired signal paths, that combines the RF self-interference cancellation signal and the RF receive signal to produce a reduced-interference residual RF receive signal; wherein the reduced-interference residual RF receive signal is characterized by reduction of a first portion of self-interference relative to the RF receive signal; wherein the receiver converts the reduced-interference residual RF receive signal into a reduced-interference residual digital receive signal; and
a digital self interference canceller that:
samples the digital transmit signal;
transforms, in the digital domain, the sampled digital transmit signal into a digital self-interference cancellation signal; and
combines the digital self-interference cancellation signal and the reduced-interference residual digital receive signal to produce a further-reduced-interference residual digital receive signal; wherein the further-reduced-interference residual digital receive signal is characterized by reduction of a second portion of self-interference relative to the RF receive signal.

11. The system of claim 10, wherein the set of transmit antennas consists of a single transmit antenna; wherein the set of receive antennas consists of a single receive antenna; wherein the single transmit antenna is also the single receive antenna.

12. The system of claim 10, wherein the analog self-interference canceller comprises a variable RF attenuator and a variable RF phase shifter; wherein the variable RF attenuator and the variable RF phase shifter are tuned to reduce self-interference in the reduced-interference residual RF receive signal during operation of the analog self-interference canceller.

13. The system of claim 12, wherein the inverter comprises a balun.

14. The system of claim 10, wherein the set of transmit antennas comprises a first transmit antenna and a second transmit antenna; wherein the set of receive antennas comprises a receive antenna; wherein the first transmit antenna and the receive antenna are separated by a first distance; wherein the first distance is finite and non-zero; wherein the second transmit antenna and the receive antenna are separated by a second distance; wherein the second distance is a sum of the first distance and an odd multiple of one half of a center wavelength of the RF transmit signal.

15. The system of claim 10, wherein the set of receive antennas comprises a first receive antenna and a second receive antenna; wherein the set of transmit antennas comprises a transmit antenna; wherein the first receive antenna and the transmit antenna are separated by a first distance; wherein the first distance is finite and non-zero; wherein the second receive antenna and the transmit antenna are separated by a second distance; wherein the second distance is a sum of the first distance and an odd multiple of one half of a center wavelength of the RF receive signal.

16. The system of claim 10, wherein the set of transmit antennas comprises a first transmit antenna and a second transmit antenna; wherein the system delays transmission of the RF transmit signal at the first antenna relative to transmission of the RF transmit signal at the second antenna by a first delay; wherein the first delay is selected such that destructive interference removes a third portion of self-interference from the RF receive signal.

17. The system of claim 10, wherein the analog self-interference canceller has a first dynamic range; wherein the digital self-interference canceller has a second dynamic range; wherein the first dynamic range is larger than the second dynamic range; wherein the first portion of self-interference is a larger portion of self-interference than a largest portion of self-interference removable by the digital self-interference canceller.

18. The system of claim 10, wherein the analog self-interference canceller has a first dynamic range; wherein the digital self-interference canceller has a second dynamic range; wherein the first dynamic range is larger than the second dynamic range; wherein the first portion of self-interference is a larger portion of self-interference than a largest portion of self-interference removable by the digital self-interference canceller.

* * * * *